United States Patent
Allen

(10) Patent No.: US 10,410,014 B2
(45) Date of Patent: Sep. 10, 2019

(54) CONFIGURABLE ANNOTATIONS FOR PRIVACY-SENSITIVE USER CONTENT

(71) Applicant: Microsoft Technology Licensing, LLC, Redmond, WA (US)

(72) Inventor: Phillip David Allen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 99 days.

(21) Appl. No.: 15/466,988

(22) Filed: Mar. 23, 2017

(65) Prior Publication Data

US 2018/0276401 A1    Sep. 27, 2018

(51) Int. Cl.
*H04L 29/06* (2006.01)
*G06F 21/62* (2013.01)

(52) U.S. Cl.
CPC ............... *G06F 21/6245* (2013.01)

(58) Field of Classification Search
CPC ....... G06F 21/10; G06F 21/6245; G06F 21/55
USPC ................................................ 726/26, 27, 30
See application file for complete search history.

(56) References Cited

U.S. PATENT DOCUMENTS

| | | | |
|---|---|---|---|
| 6,424,980 B1 | 7/2002 | Iizuka et al. | |
| 7,127,615 B2* | 10/2006 | Moskowitz | H04L 9/3236 713/176 |
| 7,647,638 B2* | 1/2010 | Furuyama | G06F 21/32 713/182 |
| 7,996,373 B1 | 8/2011 | Zoppas et al. | |
| 8,041,695 B2 | 10/2011 | Wang | |
| 8,280,905 B2* | 10/2012 | Shields | H04L 63/1425 706/46 |
| 8,504,553 B2 | 8/2013 | Vailaya et al. | |
| 8,533,844 B2* | 9/2013 | Mahaffey | G06F 21/564 709/203 |
| 8,627,403 B1 | 1/2014 | Kirshenbaum et al. | |

(Continued)

FOREIGN PATENT DOCUMENTS

WO    2011109766 A2    9/2011

OTHER PUBLICATIONS

"International Search Report & Written Opinion Issued in PCT Application No. PCT/US2018/022284", dated Jun. 1, 2018, 13 Pages.

(Continued)

*Primary Examiner* — Hosuk Song

(57) ABSTRACT

Systems, methods, and software for data privacy annotation frameworks for user applications are provided herein. An exemplary method includes identifying at least a first threshold quantity, an elasticity factor for modifying the first threshold quantity to a second threshold quantity, and an indication of a threshold resiliency property indicating when the second threshold quantity overrides the first threshold quantity. The method includes monitoring a content edit process of user content to identify a quantity of the user content that contains sensitive data corresponding to one or more predetermined data schemes, and during the content edit process, enabling and disabling presentation of annotation indicators for the content elements based at least in part on a current quantity with regard to the first threshold quantity, the elasticity factor for the first threshold quantity when enabled, and the indication of the threshold resiliency property.

20 Claims, 9 Drawing Sheets

(56) References Cited

U.S. PATENT DOCUMENTS

| | | | |
|---|---|---|---|
| 8,751,484 B2 | 6/2014 | Dexter et al. | |
| 8,812,844 B2 | 8/2014 | Chambers et al. | |
| 8,863,304 B1 | 10/2014 | Nagarkar et al. | |
| 8,898,796 B2 | 11/2014 | Ben-Natan et al. | |
| 8,925,099 B1* | 12/2014 | Saxe | G06F 21/6245 713/187 |
| 9,003,542 B1 | 4/2015 | MacKay et al. | |
| 9,177,174 B1 | 11/2015 | Shoemaker et al. | |
| 9,183,212 B2 | 11/2015 | Serlet | |
| 9,237,170 B2 | 1/2016 | Kiang et al. | |
| 9,256,727 B1 | 2/2016 | Manmohan | |
| 9,330,273 B2 | 5/2016 | Khetawat et al. | |
| 9,384,357 B2* | 7/2016 | Patil | G06F 21/60 |
| 9,454,675 B2 | 9/2016 | Kim | |
| 9,600,688 B2* | 3/2017 | Buck | G06F 21/50 |
| 2004/0044659 A1 | 3/2004 | Judd et al. | |
| 2004/0193910 A1 | 9/2004 | Moles | |
| 2006/0242180 A1 | 10/2006 | Graf et al. | |
| 2007/0183000 A1 | 8/2007 | Eisen et al. | |
| 2008/0181396 A1 | 7/2008 | Balakrishnan et al. | |
| 2009/0100527 A1 | 4/2009 | Booth et al. | |
| 2009/0132419 A1 | 5/2009 | Grammer et al. | |
| 2009/0132575 A1 | 5/2009 | Kroeschel et al. | |
| 2009/0144829 A1 | 6/2009 | Grigsby et al. | |
| 2009/0259670 A1 | 10/2009 | Inmon | |
| 2009/0307249 A1 | 12/2009 | Koifman et al. | |
| 2010/0042583 A1 | 2/2010 | Gervais et al. | |
| 2010/0063843 A1 | 3/2010 | Kenedy et al. | |
| 2010/0205189 A1 | 8/2010 | Ebrahimi et al. | |
| 2011/0099638 A1 | 4/2011 | Jones et al. | |
| 2011/0239113 A1 | 9/2011 | Hung et al. | |
| 2012/0030165 A1 | 2/2012 | Guirguis et al. | |
| 2012/0078895 A1 | 3/2012 | Chu-carroll et al. | |
| 2012/0137371 A1 | 5/2012 | Geva | |
| 2012/0239540 A1 | 9/2012 | Rogers et al. | |
| 2012/0259877 A1 | 10/2012 | Raghunathan et al. | |
| 2012/0278709 A1 | 11/2012 | Kanzaki et al. | |
| 2013/0304690 A1 | 11/2013 | Perlmutter et al. | |
| 2014/0075542 A1 | 3/2014 | Boback et al. | |
| 2014/0188921 A1 | 7/2014 | Thomason et al. | |
| 2014/0304197 A1 | 10/2014 | Jaiswal et al. | |
| 2014/0344569 A1 | 11/2014 | Li | |
| 2015/0040237 A1 | 2/2015 | Vandervort | |
| 2015/0205816 A1 | 7/2015 | Periyagaram et al. | |
| 2015/0254530 A1 | 9/2015 | Gulwani et al. | |
| 2016/0117517 A1 | 4/2016 | Li et al. | |
| 2016/0203331 A1 | 7/2016 | Khan et al. | |
| 2017/0132420 A1 | 5/2017 | Shetty et al. | |
| 2017/0300635 A1 | 10/2017 | Ganesan et al. | |
| 2018/0004976 A1 | 1/2018 | Davis et al. | |
| 2018/0276393 A1 | 9/2018 | Allen et al. | |
| 2018/0276402 A1 | 9/2018 | Allen et al. | |

OTHER PUBLICATIONS

"International Search Report and Written Opinion Issued in PCT Application No. PCT/US2018/022767", dated Jun. 8, 2018, 11 Pages.

"McAfee Total Protection for Data Loss Prevention", http://www.mcafee.com/in/resources/solution-briefs/sb-total-protection-for-dlp.pdf, Published on: 2014, 4 pages.

Hart, et al., "Text Classification for Data Loss Prevention", In Proceedings of the 11th International Conference on Privacy Enhancing Technologies, Jul. 27-29, 2011, 20 pages.

"IBM Data Security Services for endpoint data protection—endpoint data loss prevention solution", https://www-935.ibm.com/services/us/gts/pdf/sp_br_endpoint-data-loss-prevention-solution.pdf, Published on: 2008, 7 pages.

"Scan Your Email Traffic Using Data Loss Prevention", https://support.google.com/a/answer/6280516?hl=en, Published on: Nov. 26, 2016, 4 pages.

"Salesforce Security with Visibility, Control & Data Protection", https://www.ciphercloud.com/products/ciphercloud-for-salesforce/, Retrieved Date: Jan. 16, 2017, 9 pages.

"Dynamic Data Masking", https://msdn.microsoft.com/en-in/library/mt130841.aspx, Published on: Sep. 26, 2016, 3 pages.

Bastos Dos Santos, Jose Eduardo, "Automatic content extraction on semi-structured documents", In Proceedings of International Conference on Document Analysis and Recognition, Sep. 18, 2011, pp. 1235-1239.

Thakur, et al., "Information extraction from semi-structured document and un-structured documents using probabilistic context free grammar inference", In Proceedings of International Conference on Information Retrieval & Knowledge Management, Mar. 13, 2012, pp. 273-276.

"Non-Final Office Action Issued in U.S. Appl. No. 15/467,029", dated Oct. 31, 2018, 12 Pages.

Wuchner, et al., "Data Loss Prevention based on data-driven Usage Control", In Proceedings of 23rd International Symposium on Software Reliability Engineering, Nov. 27, 2012, pp. 151-160.

"Keep an Eye on your Data using OpenDLP", Retrieved From: https://blog.rootshell.be/2010/04/30/keep-an-eye-on-your-data-using-opendlp/, Apr. 30, 2010, 11 Pages.

* cited by examiner

CONFIGURABLE ANNOTATIONS FOR PRIVACY-SENSITIVE USER CONTENT

BACKGROUND

Various user productivity applications allow for data entry and analysis of user content. These applications can provide for content creation, editing, and analysis using spreadsheets, presentations, text documents, mixed-media documents, messaging formats, or other user content formats. Among this user content, various textual, alphanumeric, or other character-based information might include sensitive data that users or organizations might not want to include in published or distributed works. For example, a spreadsheet might include social security numbers (SSNs), credit card information, health care identifiers, or other information. Although the user entering this data or user content might have authorization to view the sensitive data, other entities or distribution endpoints might not have such authorization.

Information protection and management techniques can be referred to as data loss protection (DLP) that attempts to avoid misappropriation and misallocation of this sensitive data. In certain content formats or content types, such as those included in spreadsheets, slide-based presentations, and graphical diagramming applications, user content might be included in various cells, objects, or other structured or semi-structured data entities. Moreover, sensitive data might be split among more than one data entity. Difficulties can arise when attempting to identify and protect against sensitive data loss when such documents include sensitive data.

Overview

Systems, methods, and software for data privacy annotation frameworks for user applications are provided herein. An exemplary method includes identifying at least a first threshold quantity, an elasticity factor for modifying the first threshold quantity to a second threshold quantity, and an indication of a threshold resiliency property indicating when the second threshold quantity overrides the first threshold quantity. The method includes monitoring a content edit process of user content to identify a quantity of the user content that contains sensitive data corresponding to one or more predetermined data schemes, and during the content edit process, enabling and disabling presentation of annotation indicators for the content elements based at least in part on a current quantity with regard to the first threshold quantity, the elasticity factor for the first threshold quantity when enabled, and the indication of the threshold resiliency property.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
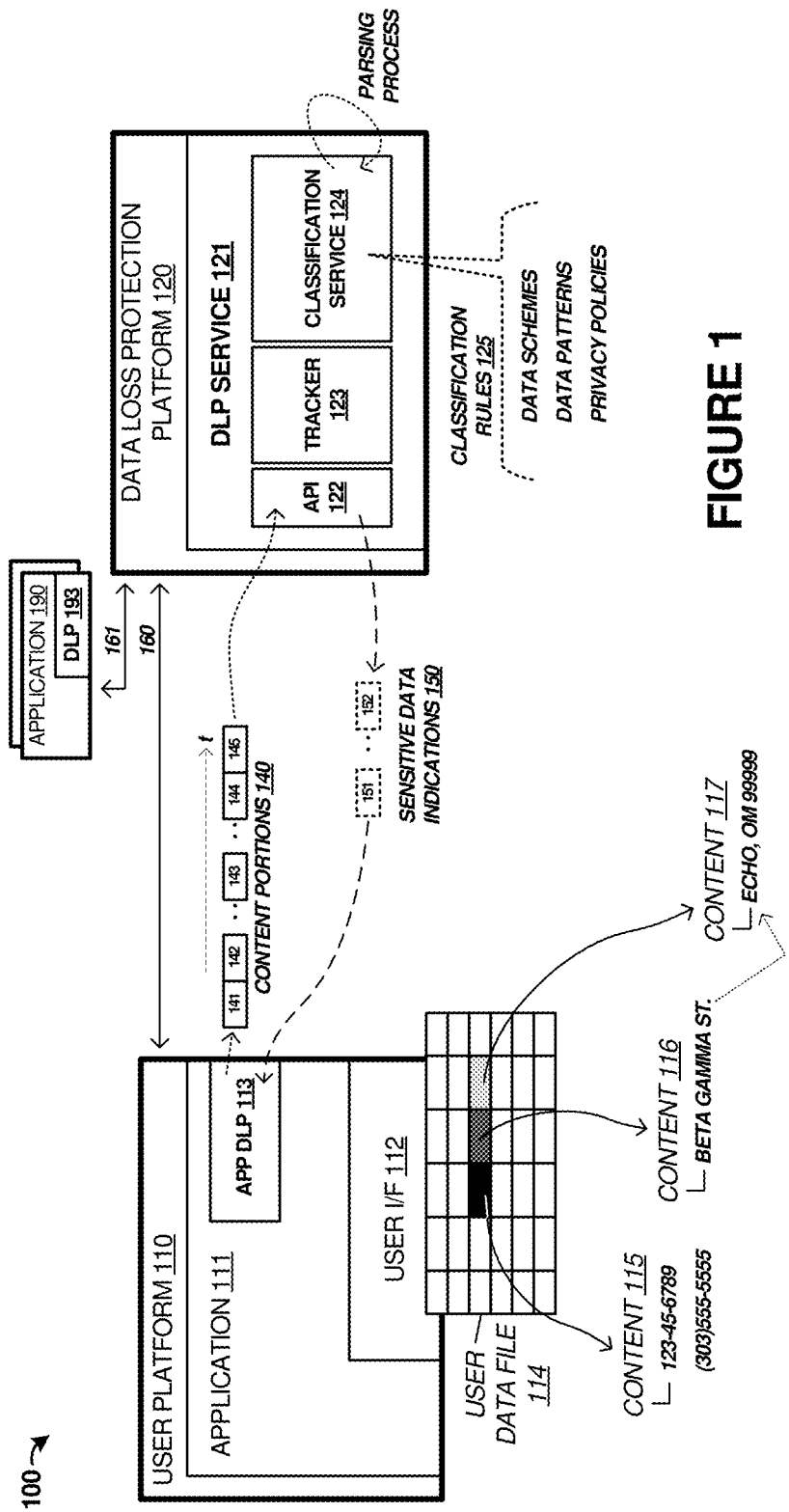
FIG. 1 illustrates a data loss protection environment in an example.

User productivity applications provide for user data and content creation, editing, and analysis using spreadsheets, slides, vector graphics elements, documents, emails, messaging content, databases, or other application data formats and types. Among the user content, various textual, alphanumeric, or other character-based information might be included. For example, a spreadsheet might include social security numbers (SSNs), credit card information, health care identifiers, passport numbers, or other information. Although the user entering this data or user content might have authorization to view the sensitive data, other entities or distribution endpoints might not have such authorization. Various privacy policies or data privacy rules can be established that indicate which types of data or user content are sensitive in nature. Enhanced data loss protection (DLP) measures discussed herein can be incorporated to attempt to avoid misappropriation and misallocation of this sensitive data.

In certain content formats or content types, such as those included in spreadsheets, slide-based presentations, and graphical diagramming applications, user content might be included in various cells, objects, or other structured or semi-structured data entities. Moreover, sensitive data might be split among more than one data element or entry. The examples herein provide for enhanced identification of sensitive data in user data files that include structured data elements. Moreover, the examples herein provide for enhanced user interfaces for alerting users to sensitive data. These user interface elements can include marking individual sensitive data-containing data elements, as well as thresholds for alerting during editing of the content.

In one example application that uses structured data elements, such as a spreadsheet application, data can be entered into cells that are arranged into columns and rows. Each cell can contain user data or user content and can also include one or more expressions that are used to perform calculations, which can reference user-entered data in one or more other cells. Other user applications, such as slide show presentation applications, can include user content on more than one slide as well as within objects included on these slides.

Advantageously, the examples and implementations herein provided for enhanced operations and structures for data loss protection services. These enhanced operations and structures have technical effects of faster identification of sensitive content within documents and especially for structured documents, such as spreadsheets, presentations, graphical drawings, and the like. Moreover, multiple applications can share a single classification service that provides detection and identification of sensitive content in user data files across many different applications and end user platforms. End-user level annotation and obfuscation processes also provide significant advantages and technical effects in the user interfaces to applications. For example, users can be presented with graphical annotations of sensitive content, and popup dialog boxes that present various obfuscation or masking options. Various enhanced annotation thresholds can also be established to dynamically indicate sensitive content to users to make user content editing and sensitive data obfuscation more efficient and compliant with various data loss protection policies and rules.

As a first example of a data loss protection environment for a user application, FIG. 1 is provided. FIG. 1 illustrates data loss protection environment 100 in an example. Environment 100 includes user platform 110 and data loss protection platform 120. The elements of FIG. 1 can communicate over one or more physical or logical communication links. In FIG. 1, links 160-161 are shown. However, it should be understood that these links are only exemplary and one or more further links can be included, which might include wireless, wired, optical, or logical portions.

A data loss protection framework can include portion local to a specific user application, and a shared portion employed across many applications. User platform 110 provides an application environment for a user to interact with elements of user application 111 via user interface 112. During user interaction with application 111, content entry and content manipulation might be performed. Application data loss protection (DLP) module 113 can provide portions of the functionality for sensitive data annotation and replacement within application 111. Application DLP module 113 is local to user platform 110 in this example, but might instead be separate from or integrated into application 111. Application DLP module 113 can provide for sensitive data annotation and replacement for users and application 111. Data loss protection platform 120 provides a shared portion of a data loss protection framework, and provides a shared DLP service 121 for many applications to share, such as applications 190 with associated location DLP portion 193.

In operation, application 111 provides user interface 112 through which users can interact with application 111, such as to enter, edit, and otherwise manipulate user content which can be loaded via one or more data files or entered via user interface 112. In FIG. 1, a spreadsheet workbook is shown with cells arranged into rows and columns. As a part of application 111, a data loss protection service is provided that identifies sensitive user content and allows the users to replace the sensitive user content with safe text or data. The sensitive content comprises content that might have privacy concerns, privacy policies/rules, or other properties for which dissemination would be undesired or unwanted. Data loss in this context refers to the dissemination of the private or sensitive data to unauthorized users or endpoints.

To identify the sensitive content, application 111 provides apportions the user content into pieces or chunks of the user content to a data loss protection service. In FIG. 1, content portions 140 are shown with individual content portions 141-145 being provided over time to DLP service 121. Typically, application 111 can process the user content to apportion the user content into the portions during idle periods, such as when one or more processing threads related to application 111 are idle or below activity thresholds. As will be discussed herein, structured user content is transformed into a 'flattened' or non-structured arrangement during the apportionment process. This non-structured arrangement has several advantages for processing by DLP service 121.

DLP service 121 then processes each portion or 'chunk' of user content individually to determine if the portions contain sensitive content. Various classification rules 125, such as data schemes, data patterns, or privacy policies/rules can be in introduced to DLP service 121 for identification of the sensitive data. After DLP service 121 parses through each individual chunk of user content, location offsets of the sensitive data in the user data file are determined an indicated to application DLP service 113. A mapper function in application DLP service 113 determines a structural relationship between chunk offsets and the structure of the document. Indications of the location offsets, sensitive data lengths, and sensitive data types can be provided to application 111, as seen for example sensitive data indications 150. The location offsets indicated by DLP service 121 might not produce an exact or specific location among the structural elements of the user data file for the sensitive content. In these instances, a mapping process can be employed by application DLP service 113 of application 111 to determine specific structural elements that contain the sensitive data.

Once specific locations are determined, then application 111 can annotate the sensitive data within user interface 112. This annotation can include global or individual flagging or marking of the sensitive data. The annotations can comprise 'policy tips' presented in a user interface. Users can then be presented with one or more options to obfuscate or otherwise render the user content unidentifiable as the original sensitive content. Various thresholds on notification of the sensitive content can be established that trigger on counts or quantities of the sensitive data present in the user data file.

In one example, user data file 114 includes content 115, 116, and 117 in particular cells of user data file 114, which might be associated with a particular worksheet or page of the spreadsheet workbook. Various content can be included in the associated cells, and this content might comprise potentially sensitive data, such as the examples seen in FIG. 1 for SSNs, phone numbers, and addresses. Some of this content might cross structural boundaries in the user data file, such as spanning multiple cells or spanning multiple graphical objects. If the 'chunk' apportions the data into rows or row groupings, then flattened representations (i.e. stripped of any structural content) can still identify sensitive data within one or more cells.

Elements of each of user platform 110 and DLP platform 120 can include communication interfaces, network interfaces, processing systems, computer systems, microprocessors, storage systems, storage media, or some other processing devices or software systems, and can be distributed among multiple devices or across multiple geographic locations. Examples of elements of each of user platform 110 and DLP platform 120 can include software such as an operating system, applications, logs, interfaces, databases, utilities, drivers, networking software, and other software stored on a computer-readable medium. Elements of each of user platform 110 and DLP platform 120 can comprise one or more platforms which are hosted by a distributed computing system or cloud-computing service. Elements of each of user platform 110 and DLP platform 120 can comprise logical interface elements, such as software defined interfaces and Application Programming Interfaces (APIs).

Elements of user platform 110 include application 111, user interface 112, and application DLP module 113. In this example, application 111 comprises a spreadsheet application. It should be understood that user application 111 can comprise any user application, such as productivity applications, communication applications, social media applications, gaming applications, mobile applications, or other applications. User interface 112 comprises graphical user interface elements that can produce output for display to a user and receive input from a user. User interface 112 can comprise elements discussed below in FIG. 9 for user interface system 908. Application DLP module 113 comprises one or more software elements configured to apportion content for delivery to a classification service, annotate data indicated as sensitive, and obfuscate sensitive data, among other operations.

Elements of DLP platform 120 include DLP service 121. DLP service 121 includes an external interface in the form of application programming interface (API) 122, although other interfaces can be employed. DLP service 121 also include tracker 123 and classification service 124, which will be discussed in more detail below. API 122 can include one or more user interfaces, such as web interfaces, APIs, terminal interfaces, console interfaces, command-line shell interfaces, extensible markup language (XML) interfaces, among others. Tracker 123 maintains counts or quantities of sensitive data found for a particular document within flattened portions of structured user content, and also maintains a record of location offsets within the flattened portions of structured user content that correspond to locations of sensitive data within structured user content. Tracker 123 can also perform threshold analysis to determine when threshold quantities of sensitive data are found and should be annotated by application DLP module 113. However, in other examples, the threshold/count portions of DLP service 121 might be included in DLP module 113. Classification service 124 parses through flattened user content to determine presence of sensitive data, and can employ various inputs that define rules and policies for identifying the sensitive data. Elements of application DLP module 113 and shared DLP service 121 might be configured in different arrangements or distributions that shown in FIG. 1, such as when portions of shared DLP service 121 are included in application DLP module 113 or application 111, among other configurations. In one example, portions of shared DLP service 121 comprise a dynamic linked library (DLL) included on user platform 110 for use by application 111 and application DLP module 113.

Links 160-161, along with other links not shown among the elements of FIG. 1 for clarity, can each comprise one or more communication links, such as one or more network links comprising wireless or wired network links. The links can comprise various logical, physical, or application programming interfaces. Example communication links can use metal, glass, optical, air, space, or some other material as the transport media. The links can use various communication protocols, such as Internet Protocol (IP), Ethernet, hybrid fiber-coax (HFC), synchronous optical networking (SONET), asynchronous transfer mode (ATM), Time Division Multiplex (TDM), circuit-switched, communication signaling, wireless communications, or some other communication format, including combinations, improvements, or variations thereof. The links can be direct links or may include intermediate networks, systems, or devices, and can include a logical network link transported over multiple physical links.

Figure 2:
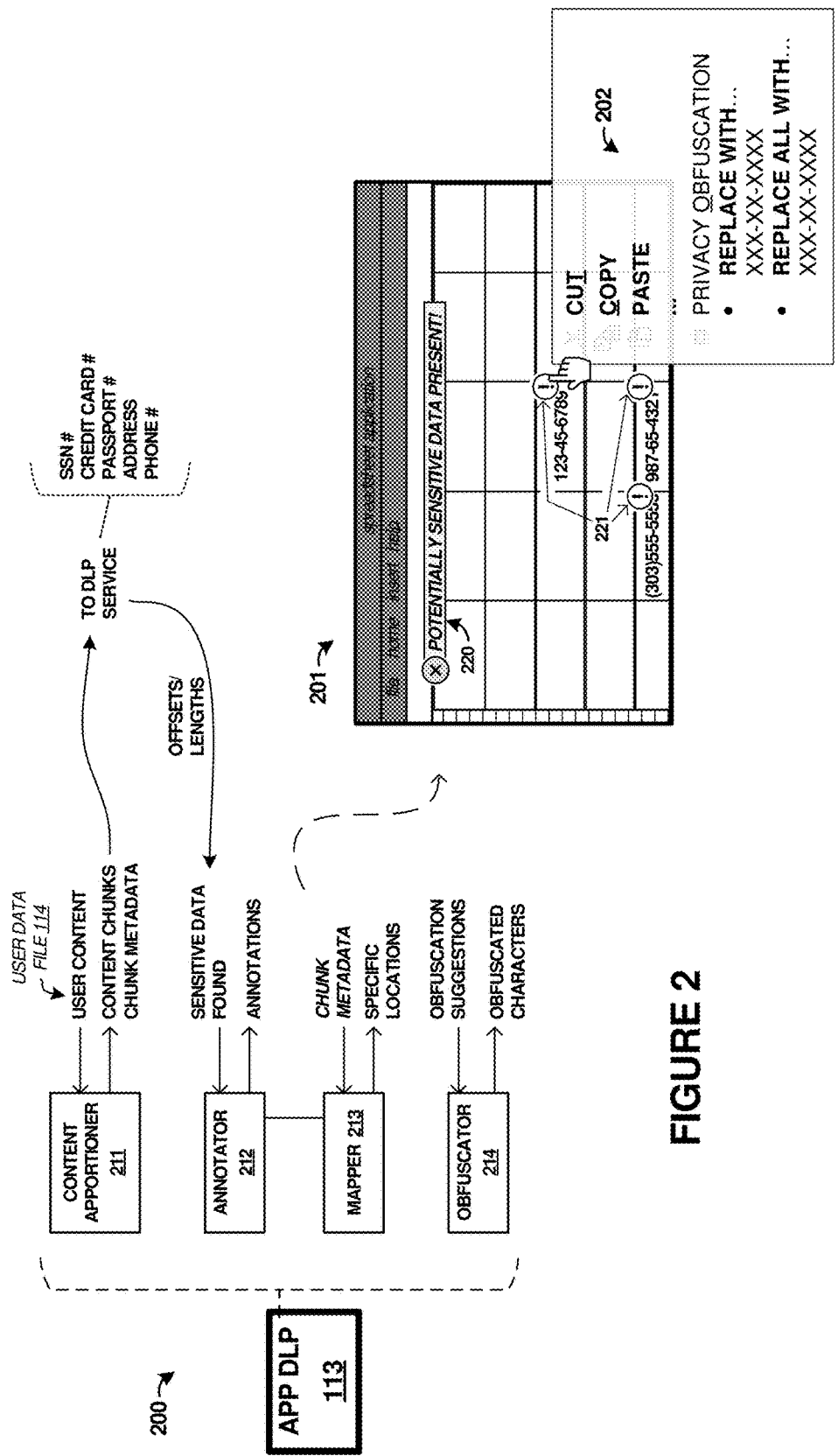
FIG. 2 illustrates elements of a data loss protection environment in an example.

For a further discussion of the elements and operation of environment 100, FIG. 2 is presented. FIG. 2 is a block diagram illustrating example configuration 200 of application DLP module 113, which highlights example operations of application DLP module 113, among other elements. In FIG. 2, application DLP module 113 includes content apportioner 211, annotator 212, mapper 213, and obfuscator 214. Each of elements 211-214 can comprise software modules employed by application DLP module 113 to operate as discussed below.

In operation, user content is provided to application DLP module 113, such as a spreadsheet file or workbook as seen in FIG. 1 for user data file 114. This user data file can be organized into a structured or semi-structured format, such as cells organized by rows and columns for a spreadsheet example. Other data formats can instead be employed, such as slide show presentations having pages/slides and many individual graphical objects, vector drawing programs with various objects on various pages, word processing documents with various objects (tables, text boxes, pictures), databases, web page content, or other formats, including combinations thereof. The user data files might contain sensitive content or sensitive data. This sensitive data can include any user content that fits one or more patterns or data schemes. Example sensitive data types include social security numbers, credit card numbers, passport numbers, addresses, phone numbers, or other information.

In parallel with editing or viewing of the user data file, content apportioner 211 subdivides the user content into one or more portions or 'chunks' which are in a flattened form from the original/native structured or hierarchical form. Content apportioner 211 can then provide these content chunks to shared DLP service 121, along with chunk metadata for each chunk. The chunk metadata can indicate various chunk properties, such as a location offset of the chunk in the total content and a length of the chunk. The location offset corresponds to a location of the chunk in relation to the overall user document/file, and the chunk length corresponds to a size of the chunk.

Shared DLP service 121 individually parses the content chunks to identify sensitive data among the flattened user content of the chunks, and provides indications of the sensitive data back to application DLP module 113. In some examples discussed below, various thresholds are applied to counts or quantities of sensitive data before indications are provided to application DLP module 113. The indications comprise offsets for each of the chunks that contain sensitive data, lengths of the chunks, and optionally indicators of data types or data schemes associated with the sensitive data. The sensitive data indications can be employed to determine actual or specific locations of the sensitive content among the structured data of the user data file. The indicators of the data types can be symbolically or numerically encoded indicators, such as integer values, that are referenced to a listing of indicators that mapper 213 can used to identify the data types for annotation.

Mapper 213 can be employed to convert the offsets and lengths into specific locations within a document or user file. The offsets and lengths correspond to specific chunk identities that are maintained by mapper 213 and stored in association with a session identifier. The session identifier can be a unique identifier that persists at least as long as the session during which the user has the document open or viewed. Mapper 213 can be provided with chunk metadata from content apportioner 211 to form mapped relationships between the chunk offsets, lengths, and session identifiers. Responsive to receiving indications of the sensitive data, mapper 213 can employ the mapped relationships to identify coarse locations indicated for the sensitive data to within a document that correspond to the chunk offset and lengths. Since the chunks might encompass more than one structural or hierarchical element of the user data file, mapper 213 might perform further location processes to find specific locations in the user data file for the sensitive data.

For example, the offsets might indicate coarse locations such as a particular row or particular column in a spreadsheet. To determine a specific location, such as a cell within the indicated row or column, mapper 213 can use the offsets/lengths along with local knowledge of the structured data and the user data file itself to locate the sensitive content among the structured data. Mapper 213 determines where in the user data file that the chunks are provided from, such as associated rows, columns, worksheets for spreadsheet examples, and associated slides/pages and objects for slideshow examples. Other examples, such as word processing examples, might not have much structure, and the content is more readily flattened and offsets can be based on document word counts or similar positioning.

In some examples, specific locations are determined by searching for the sensitive content in a particular coarse location. When multiple structural elements or hierarchical elements are implicated by a particular offset, the mapper 213 can iteratively search or walk through each of the elements to locate the sensitive data. For example, if there are 'n' levels of structure/hierarchy in a document, then mapper 213 can navigate upper hierarchies first and then lower hierarchies afterwards. In spreadsheet examples, the hierarchy/structure might comprise worksheets having associated rows and columns. In presentation document examples, the hierarchy/structure might comprise slides/pages having associated shapes/objects. Each worksheet and slide indicated by the offset can be progressed through to find the exact cells or objects that contain the sensitive content. In further examples, locating the sensitive data can be done by re-creating one or more chunks associated with the coarse location and finding the sensitive data within those re-created chunks to find the specific location of the sensitive data.

Once the specific locations of the sensitive data have been determined, then annotator 212 can be employed to mark or otherwise flag the sensitive data to a user. This annotation can take the form of a global flag or banner that indicates to the user that sensitive content is present in the user data file. This annotation can take the form of individual flags that indicate marks proximate to the sensitive data. In one example, FIG. 2 shows configuration 201 with a view of a spreadsheet user interface that has a workbook presently open for viewing or editing. A banner annotation 220 is shown as well as individual cell annotations 221. Individual cell annotations 221 comprise graphical indications that annotate one or more portions of the user content and comprise indicators positioned proximate to the one or more portions that are selectable in user interface 112 to present obfuscation options.

A user can be presented with one or more options when a particular annotation is selected. Popup menu 202 might be presented that includes various viewing/editing options, such as cut, copy, paste, among others. Popup menu 202 can also include obfuscation options. Selection of one of the obfuscation options can produce obfuscated content that maintains a data scheme of the associated user content, and comprises symbols selected to prevent identification of the associated user content while maintaining the data scheme of the associated user content. In some examples, the symbols are selected based in part on the data scheme of the associated user content, among other considerations. For instance, if the data scheme includes a numerical data scheme, then letters might be used as the obfuscation symbols. Likewise, if the data scheme includes an alphabetic data scheme, then numbers might be used as the obfuscation symbols. Combinations of letters and numbers, or other symbols, might be selected as the obfuscation symbols in alphanumerical content examples.

In FIG. 2, a first obfuscation option includes replacing the sensitive content with masked or otherwise obfuscated text, while a second obfuscation option includes replacing all content with a pattern or data scheme similar to the content of the currently selected annotation. For example, if a SSN is included in a cell, a user might be presented with options to replace the digits in the SSN with 'X' characters while leaving intact a data scheme of the SSN, i.e. leaving in the familiar "3-2-4" character arrangement separated by dash characters. Moreover, a further obfuscation option can include an option to replace all of the SSNs that fit the pattern of the selected SSN with 'X' characters. It should be understood that different example obfuscation options can be presented, and different characters can be used in the replacement process. However, regardless of the obfuscation characters employed, the sensitive data is rendered anonymized, sanitized, 'clean,' or unidentifiable as the original content.

Figure 3:
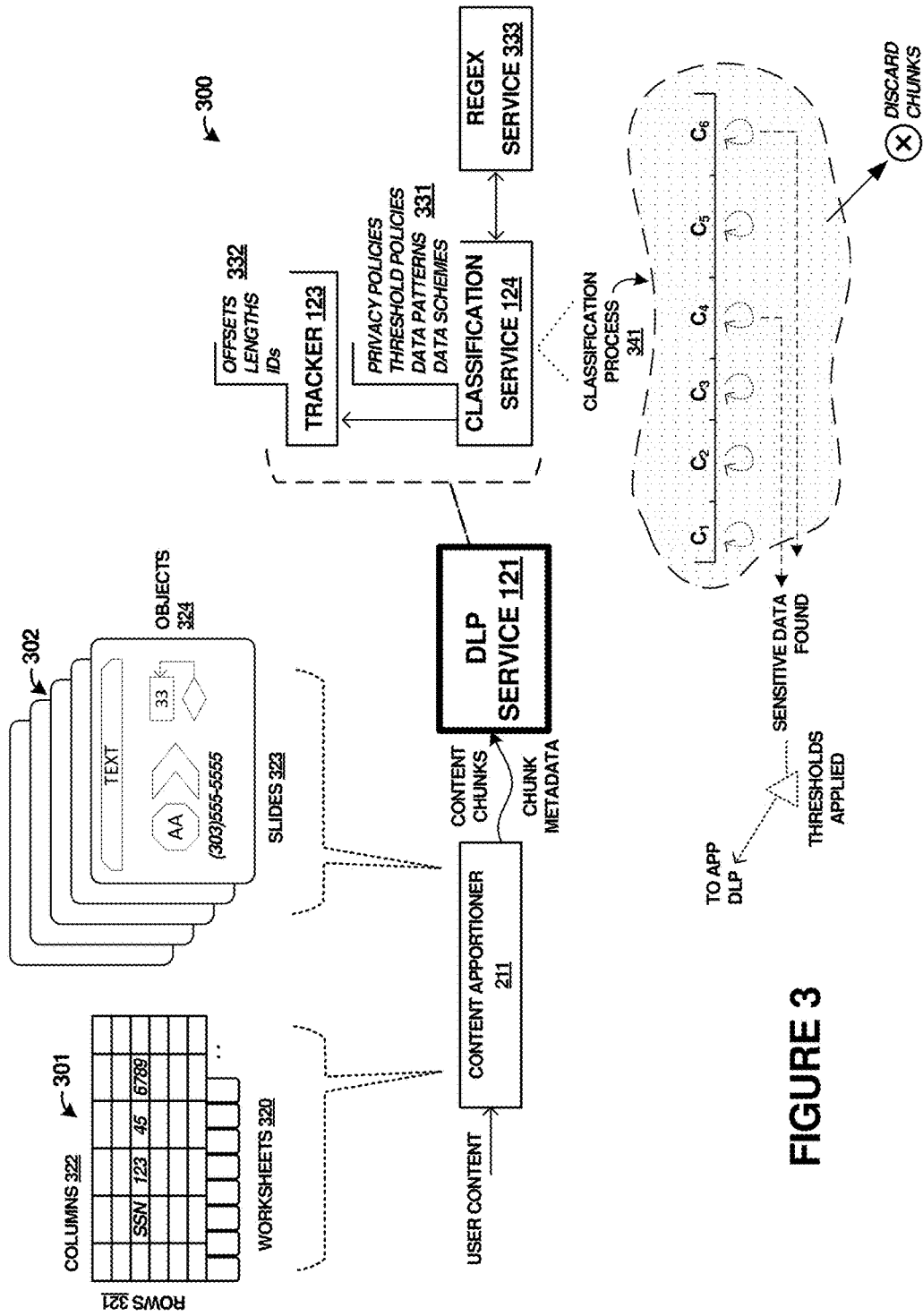
FIG. 3 illustrates elements of a data loss protection environment in an example.

Turning now to FIG. 3, example configuration 300 is shown to focus on aspects of DLP service 121. In FIG. 3, DLP service 121 receives portions of flattened user content, provided in one or more content chunks by content apportioner 211, along with chunk metadata that at least includes offsets into the total content and lengths of the chunks. Two example types of structured user content are shown in FIG. 3, namely spreadsheet content 301 and slideshow/presentation content 302. Spreadsheet content 301 has structure reflecting rows 321 and columns 322 that define individual cells. Moreover, spreadsheet content 301 might have more than one worksheet 320 that is delimited by tabs below the worksheet, and each worksheet can have a separate set of rows/columns. Each cell might have user content, such as characters, alphanumeric content, text content, numerical content, or other content. Slideshow content 302 can have one or more slides or pages 323 that include a plurality of objects 324. Each object might have user content, such as characters, alphanumeric content, text content, numerical content, or other content.

Content apportioner 211 subdivides the user content into pieces and removes any associated structure, such as by extracting any user content, such as text or alphanumeric content, from cells or objects and then arranging the extracted content into flattened or linear chunks for delivery to DLP service 121. These chunks and chunk metadata are provided to DLP service 121 for discovery of potential sensitive data.

Once the individual chunks of user content are received by DLP service 121, various processing is performed on the chunks by classification service 124. Also, tracker 123 maintains data records 332 comprising one or more data structures that relate the offsets/lengths and session identifier to counts of sensitive data found. Data records 332 are stored for that DLP service 121 to provide the offsets/lengths for chunks that contain sensitive data back to a requesting application for further locating and annotation of any sensitive content found therein.

Classification service 124 parses each of the chunks against various classification rules 331 to identify sensitive data or sensitive content. Classification rules 331 can establish one or more predetermined data schemes defined by one or more expressions used to parse the flattened chunks/data representations to identify portions of the chunks as being indicative of one or more predetermined content patterns or one or more predetermined content types.

The sensitive content is typically identified based on a data structural pattern or data 'scheme' that is associated with sensitive content. These patterns or schemes can identify when the exact contents of the chunks might differ, but the data might fit a pattern or arrangement that reflects sensitive data types. For example, a SSN might have a certain data arrangement having a predetermined number of digits intermixed and separated by a predetermined number of dashes. Classification rules 331 can include various definitions and policies used in identification of sensitive data. These classification rules can include privacy policies, data patterns, data schemes, and threshold policies. The privacy policies might indicate that certain potentially sensitive data might not be indicated as sensitive to an application due to company, organization, or user policies, among other considerations. The threshold policies might establish minimum thresholds for finding sensitive data in the various chunks before the presence of sensitive data is reported to the application. Classification rules 331 can be established by users or by policy makers, such as administrators.

Additionally, classification service 124 can process the data content through one or more regular expressions handled by regular expression (regex) service 333. Regex service 333 can include regular expression matching and processing services, along with various regular expressions that a user or policy maker might deploy for identification of sensitive data. Further examples of regex service 333 are discussed below in FIG. 7.

As a specific example, classification process 341 illustrates several content chunks $C_1$-$C_8$ that are linearized versions of content originally in a structural or hierarchical arrangement in a document or user data file. Classification service 124 processes these chunks to identify ones of the chunks that comprise sensitive data. If any sensitive data is found, indications can be provided to the application. The indications can comprise offsets and lengths for the sensitive data, and are provided for mapper 213 to locate the sensitive data within the structure of the user data file. The chunks themselves can be discarded by classification service 124 after each chunk is processed for sensitive data identification. Since the offsets and lengths allow finding of the sensitive data within the original data file, and the original content remains in the data file (unless intervening edits have occurred), then the actual chunks need not be saved once processed.

To form the chunks, content apportioner 211 bundles alphanumeric content, such as text, into one or more linear data structures, such as strings or BSTRs (basic strings or binary strings). Classification service 124 processes the linear data structures and determines a list of results. The chunks are checked for sensitive data, and portions of the linear data structures can be determined as having sensitive content. Classification service 124 in conjunction with tracker 123 determine offsets/lengths corresponding to chunks that contain sensitive data among the linear data structures. These offsets can indicate coarse locations which can be translated back to specific locations in the original document (e.g. user data file) containing the user content. When the chunks are received, tracker 123 can correlate each chunk to offset/length information indicated in the chunk metadata. This offset/length information can be used to reverse-map to the structure or hierarchy of the original document by mapper 213.

However, DLP service 121 typically only has a partial context back to the original document or user data file, such as indicated by the offsets into the originally-generated linear data structures. Moreover, the linear data structures and user content themselves might have been released/deleted by classification service 124 at the end of a classification process. This can mean that classification service 124 may not be able to directly search for the sensitive content to specifically localize the sensitive content within the original document, and even if classification service 124 could search for the precise sensitive content classification service 124 might not be able to find the sensitive content because the 'chunking' algorithm might cross boundaries of hierarchical constructs or structures in the original document or data file. As a specific example, worksheet 320 in a spreadsheet document can have text "SSN 123 45 6789" spanning across four adjacent cells. Advantageously, classification service 124 can find this text as comprising sensitive content. However, due to the boundary-crossing analysis by classification service 124, at the end of policy rule evaluation, classification service 124 typically does not have enough data to find the sensitive content in the original document for presentation to a user. A user might be left with an incorrect impression that no sensitive content was present.

In order to efficiently scan the user content for sensitive content, classification service 124 reads in a chunk of user content at a time during application idle, does a partial analysis, and continues the process. When classification service 124 gets done with reading all of the content, classification service 124 only has coarse positions for sensitive content in the original content, such as only a start/offset and a length. In order to map back on to a structured or semi-structured document efficiently, a combination of techniques can be employed by mapper 213. It should be noted that these techniques differ from how a spell check or grammar check might work, in part because the total content may be required, rather than just a word/sentence/paragraph, in order to understand if the content has exceeded a threshold.

For every level of physical hierarchy or structure present in the original document (i.e. worksheets in a workbook, or slides in a presentation) mapper 213 uses an identifier to indicate existence in a mapping data structure, and further subdivide by a reasonable number of levels of hierarchy (i.e. rows in a worksheet, shapes in a slide) the content such that as each one is processed, mapper 213 keeps track of the length of the original content, and based on the order of insertion into the map, the implicit start of that element. The identifier might be a process-durable identifier that persists between open instances of a particular document, or might be different in each instance of the particular document. In some examples, calculations to amalgamate the presence/absence of sensitive content is withheld until there is no remaining unprocessed content nor any edits pending that would further change the content.

Assuming there is sensitive content, mapper 213 receives from DLP service 121 a start and length of each piece of sensitive content and mapper 213 performs a look up in the mapping data structure of the identifiers and insets of the sensitive content within the most precise mapped region to find the exact location. For performance reasons, only a certain number of levels of hierarchy might be tracked, so that a table inside of a shape inside of a slide, or a cell inside of a row inside of a worksheet might not be individually tracked. Therefore, a partial re-walk may be performed after doing a reverse mapping in order to find the precise location.

In a specific example, a workbook might have 20 worksheets, but millions of rows and each of the millions of rows might have 50 columns of user data. For a relatively small number of pieces of sensitive data in this (i.e. one sheet has only one column with sensitive data), the classification process can become extremely memory intensive to have 20*1 million*50 remembered 'length+offset' pieces of data. Removing the last dimension is a 50× savings in memory, for a small computation cost at the time that the sensitive data is actually being identified in the original document. Advantageously, a small memory footprint can be maintained to reverse map the start/lengths back onto the original content.

Figure 4:
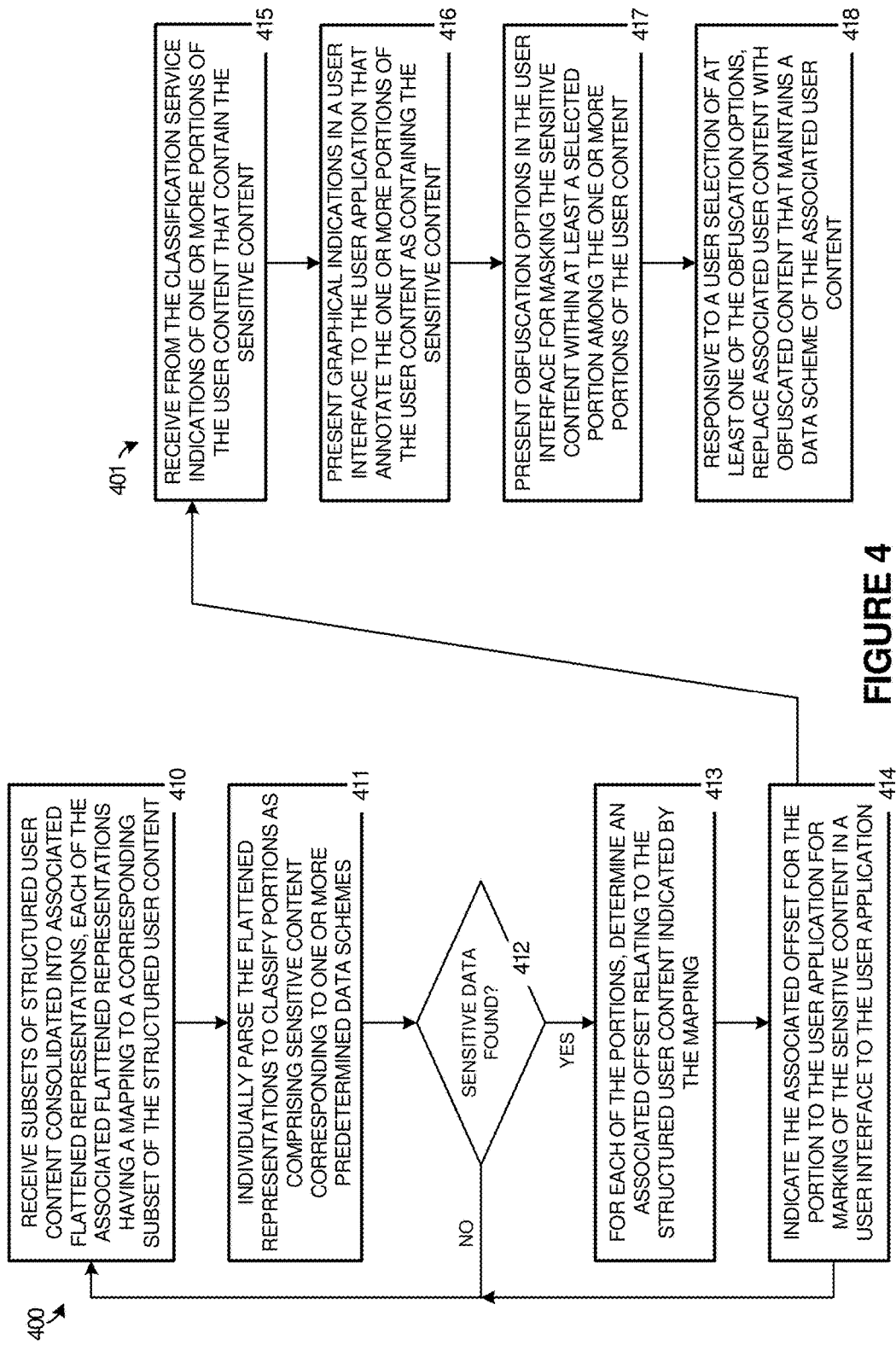
FIG. 4 illustrates operations of data loss protection environments in an example.

To further illustrate the operation of the elements of FIGS. 1-3, a flow diagram is presented in FIG. 4. Two main flows are presented in FIG. 4, namely a first flow 400 for identification of sensitive data, and a second flow 401 for annotation and obfuscation of sensitive data. First flow 400 can feed into second flow 401, although other configurations are possible.

In FIG. 4, DLP service 121 receives (410) subsets of structured user content consolidated into associated flattened representations, each of the associated flattened representations having a mapping to a corresponding subset of the structured user content. As mentioned above, the structured content might comprise spreadsheet content organized into sheets/rows/columns, or might instead include other structures such as slideshow content organized into slides/objects, drawing program content organized into pages/objects, or text content organized into pages, among other structures. These subsets of the structured user content can include 'chunks' 141-146 shown in FIG. 1 or chunks $C_1$-$C_8$ in FIG. 3, among others. The structure of the underlying user content is flattened or removed in these subsets to form the chunks, and each the subsets can map back to the original structure by referencing structural identifiers or localizers, such as sheets/rows/columns or slides/objects, for example.

DLP service 121 receives these chunks and chunk metadata, such as over link 160 or API 122 in FIG. 1, and individually parses (411) the flattened representations to classify portions as comprising sensitive content corresponding to one or more predetermined data schemes. Classification rules 125 can establish the one or more predetermined data schemes defined by one or more expressions used to parse the flattened chunks/data representations to identify portions of the chunks as being indicative of one or more predetermined content patterns or one or more predetermined content types.

If sensitive data is found (412), then for each of the portions, DLP service 121 determines (413) an associated offset/length relating to the structured user content indicated as maintained in tracker 123 in data records 332. DLP service 121 then indicates (414) at least the associated offset/length for the portions to user application 111 for marking of the sensitive content in user interface 112 to user application 111. If no sensitive data is found, or if any associated thresholds are not met, then further processing of chunks can continue or further monitoring for additional chunks as provided by user application 111. Moreover, editing or changing of the user content might prompt additional or repeated classification processes for any changed or edited user content.

Application DLP module 113 receives (415) from the classification service of DLP service 121 indications of one or more portions of the user content that contain the sensitive content, where the indications comprise offsets/lengths associated with the sensitive content. Application DLP module 113 presents (416) graphical indications in user interface 112 to user application 111 that annotate the one or more portions of the user content as containing the sensitive content. Application DLP module 113 can then present (417) obfuscation options in user interface 112 for masking the sensitive content within at least a selected portion among the one or more portions of the user content. Responsive to a user selection of at least one of the obfuscation options, application DLP module 113 replaces (418) associated user content with obfuscated content that maintains a data scheme of the associated user content.

Figure 5:
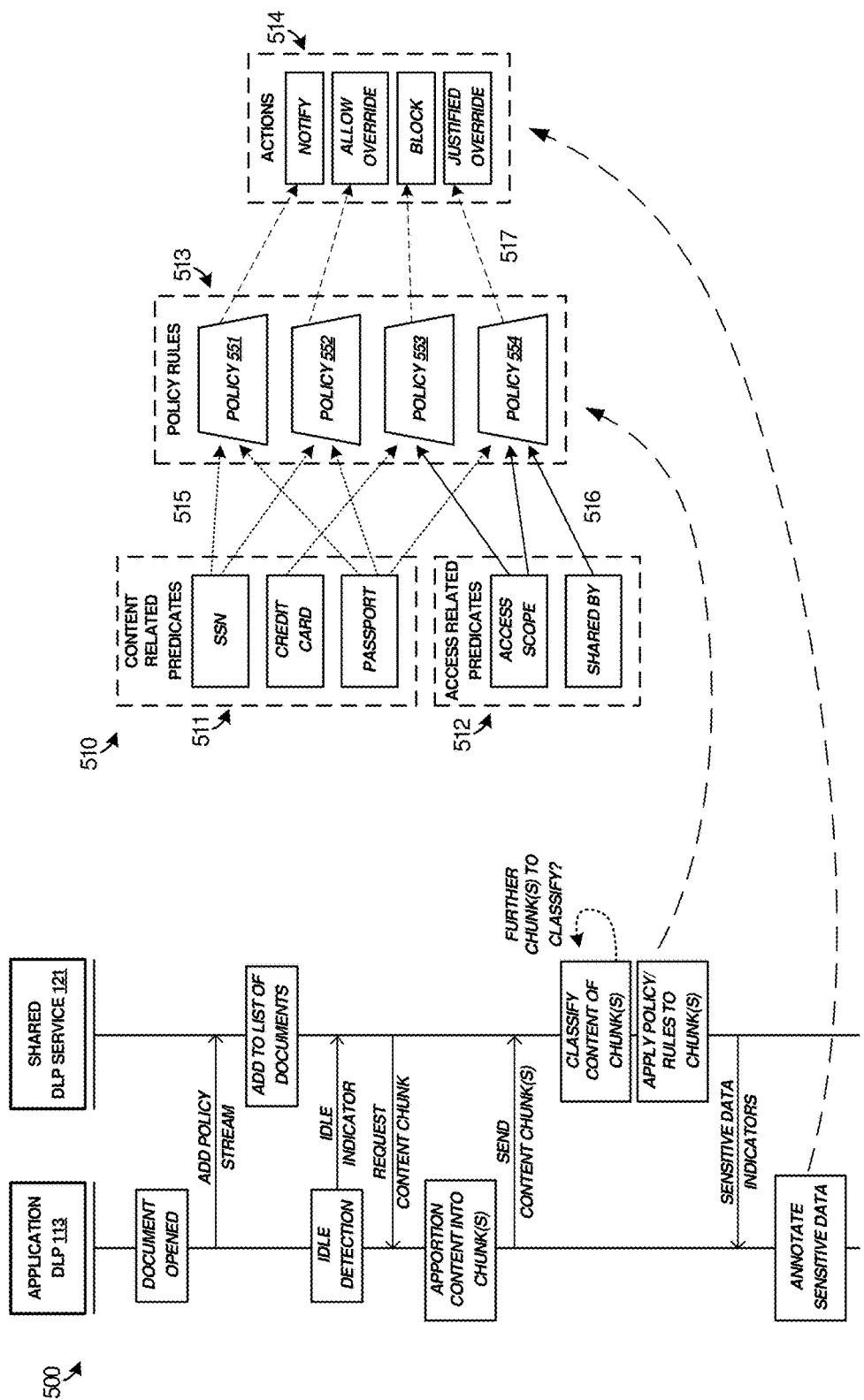
FIG. 5 illustrates operations of data loss protection environments in an example.

FIG. 5 illustrates sequence diagram 500 to further illustrate the operation of the elements of FIGS. 1-3. Furthermore, FIG. 5 includes detailed example structure 510 for some of the process steps in FIG. 5. In FIG. 5, application 111 might open a document for viewing or editing by a user. This document can be detected by application DLP module 113. Any associated policies or classification rules can be pushed to DLP service 121 to defined any classification policies. DLP service 121 can then maintain a processing instance of the open document in record 332, which might include a listing of several open documents. When idle processing timeframes of application 111 are detected by DLP module 113, an idle indicator can be presented to DLP service 121, which responsively requests chunks of user content for classification. Alternatively, DLP module 113 can push user content chunks to DLP service 121 during idle periods of application 111. DLP module 113 apportions the user content into chunks, and these chunks might be determined based on text or other content included in structures or hierarchical objects of the document. Once the chunks have been determined, DLP module 113 transfers chunks to DLP service 121 for classification. DLP service 121 classifies each chunk individually and applies classification rules to the chunks to identify potentially sensitive user content among the chunks. This classification process can be an iterative process to ensure all chunks transferred by DLP module 113 have been processed. If sensitive data or content is found among the chunks, then DLP service 121 indicates the presence of the sensitive data to DLP module 113 for further handling. As mentioned herein, the sensitive data can be indicated by offsets, coarse locations, or other location information, as well as length information. DLP module 113 can then perform one or more annotation processes and obfuscation processes on the sensitive data in the document.

The classification rules can be established ahead of the classification process, such as by users, administrators, policy personnel, or other entities. As seen in structure 510, various rules 511 and 512 can be based upon one or more predicates. Predicates are shown in two categories in FIG. 5, content related predicates 511 and access related predicates 512. Content related predicates 511 can comprise data schemes that indicate sensitive data, such as data patterns, data structural information, or regular expressions that define the data schemes. Access related predicates 512 comprise user-level, organization-level, or other access-based rules, such as content sharing rules that define when sensitive data is not desired for dissemination or release by particular users, organizations, or other factors.

Policy rules 513 can be established that combine one or more of the content related predicates and access related predicates into policies 551-554. Each policy rule also has a priority and an associated action. In general, the priority matches the severity of the action. For example, a policy rule might define that 'save' features of the application are to be blocked. In another example policy rule, user content might contain SSNs that are defined according to a content related predicate, but according to an access related predicate, these SSNs might be acceptable to disseminate. Most policy rules contain at least one classification predicate among predicates 511-512. These policies can effect one or more actions 514. The actions can include various annotation operations that an application might take in response to the identification or sensitive content, such as notification of a user, notification but allowing for a user override, blocking of features/ functions (i.e. 'save' or 'copy' features), and justified overrides, among others.

Figure 6:
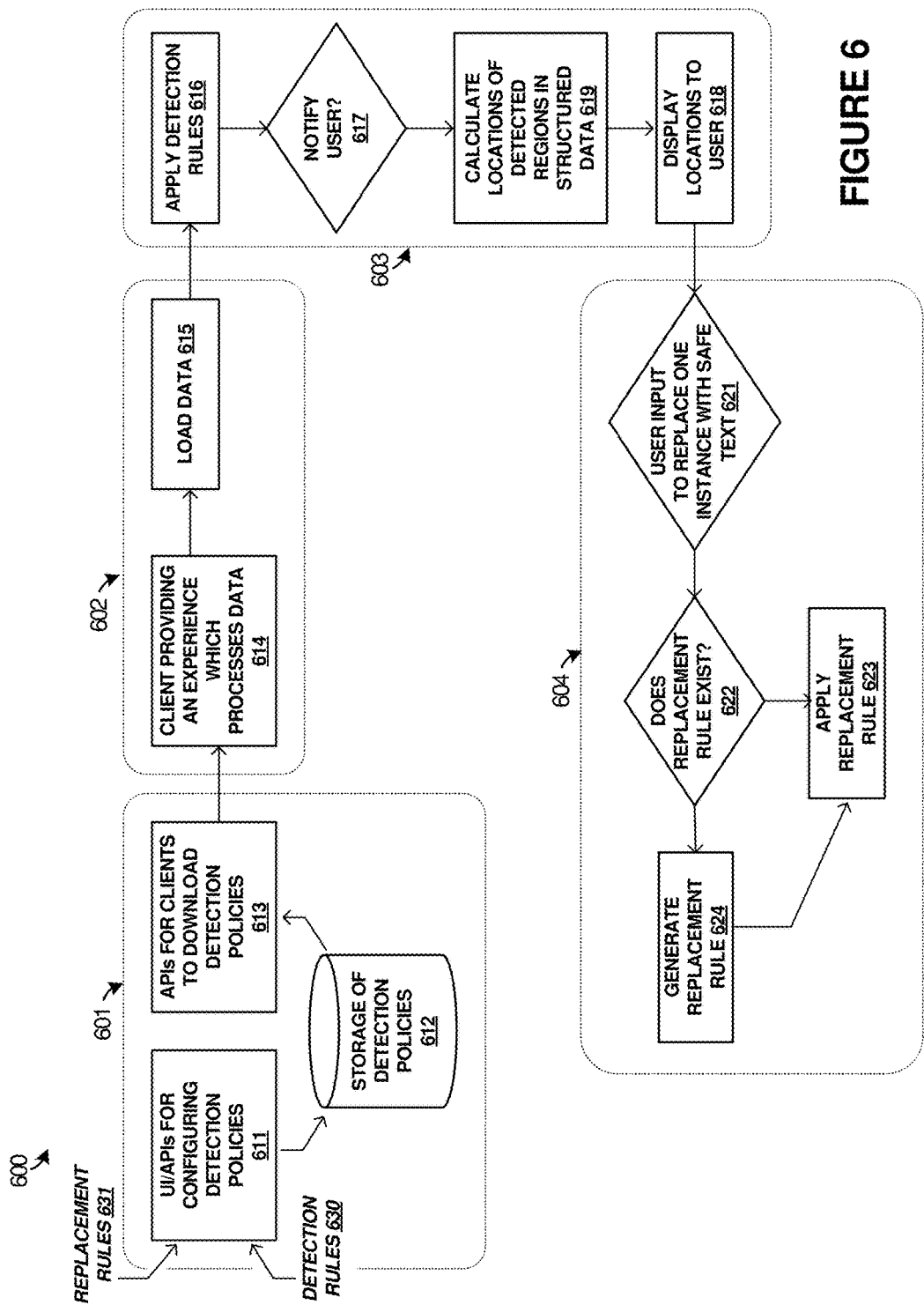
FIG. 6 illustrates operations of data loss protection environments in an example.

FIG. 6 illustrates flow diagram 600 to further illustrate the operation of the elements of FIGS. 1-3. FIG. 6 focuses on one example entire process of sensitive data identification, annotation, and obfuscation processes. Sub-process 601 comprises policy and rule establishment, storage, and retrieval. These policies and rules can annotation rules, classification rules, regular expressions, organizational/user policies, among other information discussed herein. In operation 611 of FIG. 6, various detection rules 630 and replacement rules 631 can be introduced via a user interface or API for configuring detection policies. Detection rules 630 and replacement rules 631 can comprise various predicates and rules as found in FIG. 5, among others. Users, administrators, policy personnel, or other entities can introduce detection rules 630 and replacement rules 631, such as by establishing policies for users, organizations, or application usage, among other entities and activities. Detection rules 630 and replacement rules 631 can be stored on one or more storage systems in operation 612 for later usage. When one or more clients desire to use the policies established by detection rules 630 and replacement rules 631, these policies can be downloaded or retrieved in operation 613. For example, annotation rules might be downloaded by an application for use in annotating sensitive content in a user interface, whereas classification rules might be downloaded by a shared DLP service for classifying user content as sensitive content.

Sub-process 602 comprises client-side application activities, such as loading documents for editing or viewing in a user interface, and providing chunks of those documents for classification. In operation 614, a client application can provide one or more end-user experiences to process user content, edit user content, or view user content, among other operations. Operation 614 can also provide annotation and obfuscation processes that are discussed later. Operation 615 provides portions of this user content to a shared DLP service for classification of the user content. In some examples, the portions comprise flattened chunks of user content that is stripped of associated structure or hierarchy from the original document.

Sub-process 603 comprises classification of user content to detect sensitive data among the user content, as well as annotation of this sensitive data to a user. In operation 616, various detection rules are applied, such as regular expressions discussed below in FIG. 7, among other detection rules and processes. If sensitive data is found, then operation 617 determines if a user should be notified. The notification might not occur if the quantity of sensitive data falls below an alert threshold quantity. However, if the user is to be alerted, then operation 619 can calculate locations of the sensitive data within detected regions of the structured data. As discussed herein, a mapping process can be employed to determine specific locations of sensitive data within structured elements or hierarchical elements from flattened data offsets and lengths of the sensitive data strings or portions. Once these specific locations are determined, then operation 618 can display the locations to the user. Annotations or other highlighting user interface elements are employed to signal the user that sensitive data is present among the user content.

Sub-process 604 comprises obfuscation of sensitive data within the user content comprising the structured or hierarchical elements. In operation 621, user input can be received to replace at least one instance of sensitive data with 'safe' or obfuscated data/text. When a user is shown a highlighted region demonstrating a piece of sensitive data that caused an annotation or 'policy tip' to appear, the user can be presented with an option to replace the sensitive data with 'safe text' that obfuscates the sensitive data. Depending on the choices made by the entities initially setting the policies in operation 611, operations 622 and 624 determines and generates one or more replacement or obfuscation rules. The obfuscation rules may be used for replacing an internal codename with a marketing approved name, used to obfuscate personally identifiable information (PII) with boilerplate names, may be used to replace numeric sensitive data with a set of characters that indicate to future viewers of the document regarding the type of sensitive data (i.e. credit card numbers, social security numbers, vehicle identification numbers, among others) without revealing the actual sensitive data. Operation 623 replaces the sensitive data with the obfuscated data. The obfuscated data may be used to replace numeric sensitive data with a set of characters that could be used to confirm a data scheme or content type, but remain insufficient for deriving the original data even by a determined individual (i.e. to determine that the content piece is a SSN but not reveal the actual SSN). Users can perform individual or single-instance replacement of sensitive content with obfuscated text, or bulk replacement from a user interface that shows multiple instances of sensitive content.

Replacement of sensitive content, such as text or alphanumerical content, might be done with regular expressions, or alternatively via nondeterministic finite automata (NFA), deterministic finite automata (DFA), push down automata (PDA), Turing Machines, arbitrary functional code, or other processes. Replacement of sensitive content typically comprises pattern matching among text or content. This pattern matching can leave unmasked characters or content by considering if the target pattern has the ability for multiple characters to exist in a specified location in a string and those characters need not be masked, such as for delimiter characters. For example, the string "123-12-1234" might become "xxx-xx-xxxx" and string "123 12 1234" might become "xxx xx xxxx" after a masking process. This pattern matching can also keep certain portions discernable for uniqueness purposes, such as with the last predetermined number of digits of a credit card number or SSN. For example, "1234-1234-1234-1234" might become "xxxx-xxxx-xxxx-1234" after a masking process. For code name masking/replacement, not all aspects are patterns and may indeed be internal code names or other keywords. For example, a code name "Whistler" might become "Windows XP" after a masking process. Moreover, patterns that replace a varying number of characters with safe text can be permitted to keep a length consistent or to set the length to a known constant. For example, the same rule can turn "1234-1234-1234-1234" into "xxxx-xxxx-xxxx-1234" and "xxxxx-xxxxx-x1234" after a masking process. This might require a pattern that contains sufficient data to handle any of these case. Regular expressions can handle such scenarios by augmenting the regular expression by surrounding each atom matching expression with parenthesis, and keeping track of which augmented 'match' statements are paired with which 'replace' statements. Further examples of regular expression matching are seen in FIG. 7 below.

To maintain the integrity of annotation and classification processes among more than one document/file, various processes can be established. Detection/classification, annotation, and obfuscation rules and policies are not typically included in the document files. This allows for changes to the policies and prevents reverse-engineering of the obfuscation techniques. For example, if a user saves a document, then closes and loads the same document, then the rules for what parts of the document contain the sensitive data necessary to consider the sensitive data presence a policy issue may have changed. In addition, annotation flags should not be included in clipboard operations, such as cut, copy, or paste. If a user were to copy content from one document and paste into another, that second document might have different detection/classification, annotation, and obfuscation rules applied. If a user were to content text from a first document and paste into a second document, then the first document annotations should be considered irrelevant until re-classified. Even if a user were to copy content from one document into the same document, any counts of the sensitive content might shift and what needs to be highlighted throughout the document might change.

Figure 7:
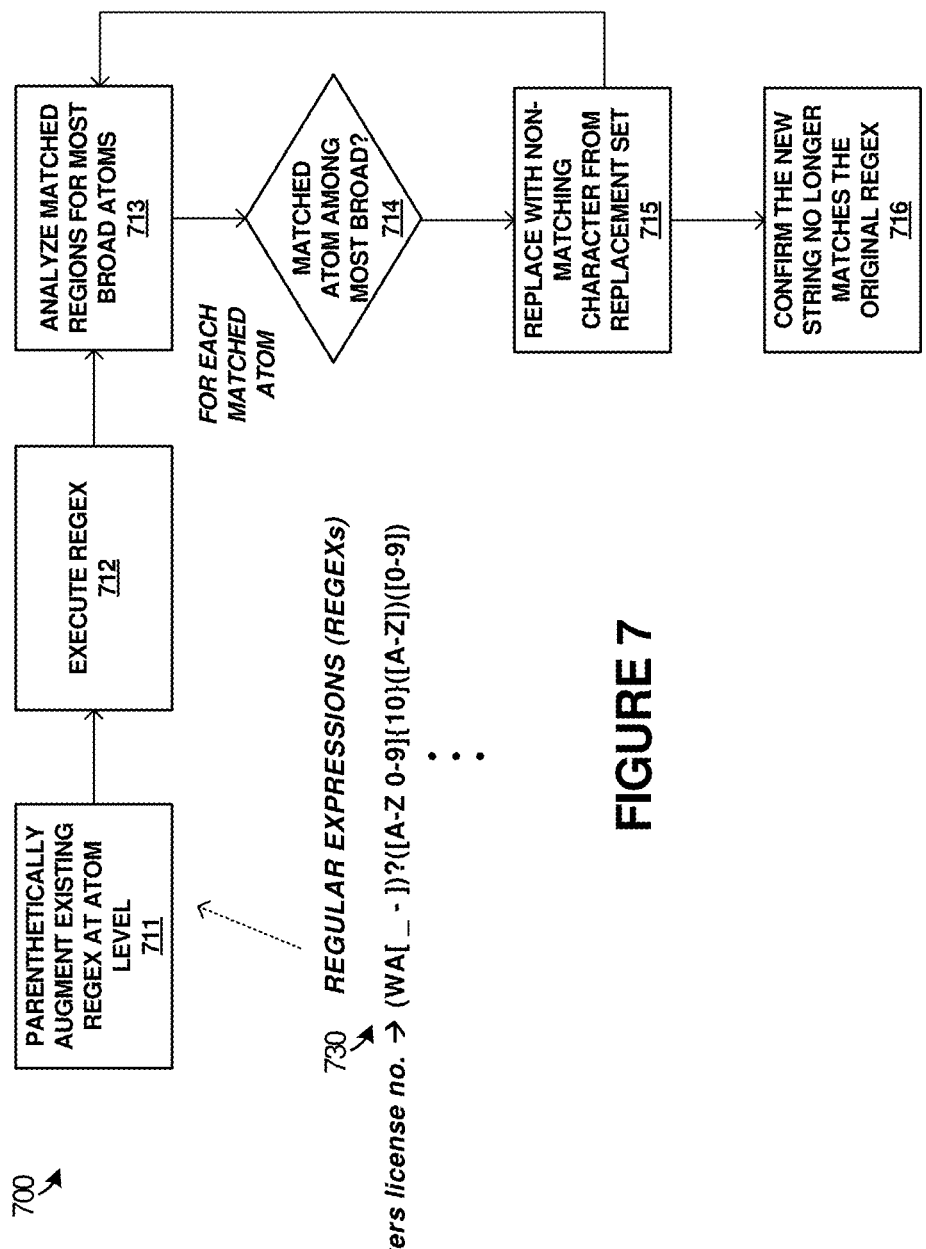
FIG. 7 illustrates operations of data loss protection environments in an example.

FIG. 7 illustrates flow diagram 700 to further illustrate the operation of the elements of FIGS. 1-3. FIG. 7 focuses on regular expression operations during sensitive data obfuscation processes. In FIG. 7, given a regular expression (regex), such as the fictional driver's license example regular expression 730, and a string that matches it, a full match can be generated by at least augmenting the regular expression by surrounding each separable character matching expression with parenthesis (e.g., each atom), as indicated in operation 711. The augmented regular expression can then be re-applied or executed in operation 712 to perform an obfuscation or masking process. For each match, operations 713-714 determine the broadest and narrowest sets of characters actually matched. For example, when the character matched is "-" the character is narrow since it is a single character. When the character matched is the set of all alphabetic characters, it is broad. The absolute count of characters that could be in any region is the key determiner. An obfuscation process in operation 715 can replace characters according to a match broadness. For those characters matched that are single characters, an obfuscation process can make no change. For those characters matched that are in broad groups, an obfuscation process replaces the characters with a 'safe' character that's not a member of the set. For example, a set of all letters becomes "0," a set of all numbers become "X," and mixed alphanumeric content becomes "?," with a fallback list of characters to use until exhausted. Once the text or content has been through an obfuscation or masking process, operation 716 confirms that the text or content has been successfully rendered obfuscated when the new text/content string no longer matches the original regex.

Figure 8:
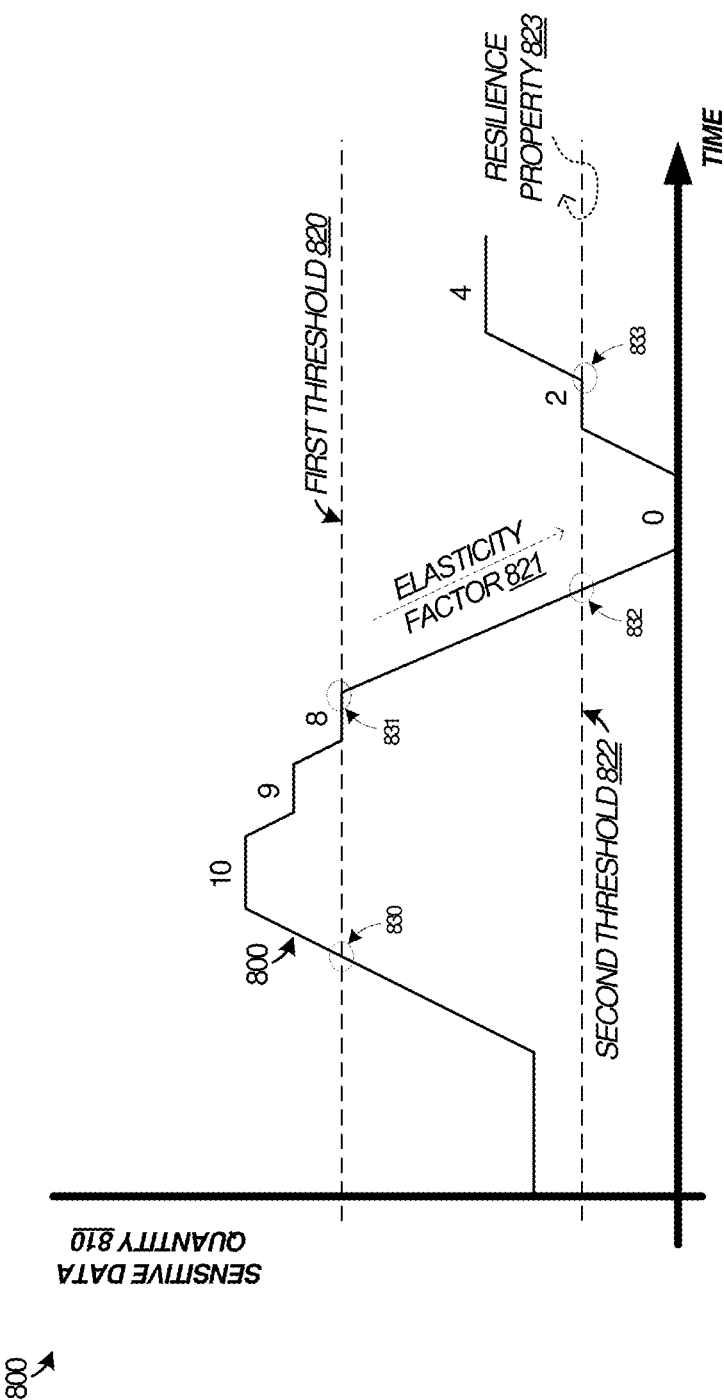
FIG. 8 illustrates data threshold operations of data loss protection environments in an example.

FIG. 8 illustrates graph diagram 800 to further illustrate the operation of the elements of FIGS. 1-3. FIG. 8 focuses on enhanced threshold processes used in the annotation of sensitive data in user interfaces. The operations of FIG. 8 can comprise enhanced hysteresis operations for annotating sensitive data, and various thresholds or annotation rules can be set up by policy administrators or users, among other entities.

FIG. 8 includes graph 800 that includes a vertical axis indicating a quantity of sensitive data/content items present in a document, and a horizontal axis indicating time. A first threshold 820 is established which can initiate presentation or removal of the annotations of sensitive content in a user interface. A second threshold 822 can be established which can also initiate presentation or removal of the annotations of sensitive content. An elasticity factor 821 and resiliency property 823 can be established to modify behavior of the first and second thresholds.

When sensitive data has been annotated in a user interface, such as by flags, markings, or highlighting, a user might edit the sensitive content to fix sensitive content issues (such as by selecting one or more obfuscation options). However, once a threshold number of sensitive content issues have been resolved, there might not be sufficient remaining instances of an issue to warrant annotation of the document as being overall in contravention of sensitive content rules for the organization or save location. Likewise, when new sensitive content is introduced into a document, there might be sufficient instances to warrant annotation of the document to indicate the sensitive content to a user.

During content edit processes by users, enabling and disabling of annotation indicators for one or more content elements can be based at least in part on a current quantity of the content elements with regard to annotation rules. Annotation rules can comprise at least first threshold quantity 820, elasticity factor 821 for modifying first threshold quantity 820 to a second threshold quantity 822 when enabled, and an indication of a threshold resiliency or 'stickiness' property 823 indicating when second threshold quantity 822 overrides first threshold quantity 820. An annotation service, such as annotator 212 can determine or identify annotation rules such as policy rules 513 and actions 514 discussed in FIG. 5 that are established for target entities associated with the content editing. The target entities can include users performing the content editing, an organization that comprises the user performing the content editing, or an application type of the user application, among others. During user editing of a document that contains sensitive content or potentially might contain sensitive content, annotator 212 monitors user content in an associated user data file presented for content editing in a user interface to the user application. Annotator 212 identifies a quantity of content elements containing sensitive content among the user content corresponding to one or more predetermined data schemes discussed herein. The content elements might include cells, objects, shapes, words, or other data structural or data hierarchical elements.

During the editing, and based at least on the quantity of content elements exceeding a first threshold quantity, annotator 212 initiates presentation of at least one annotation indicator in the user interface that flags the user content in the user interface as containing at least first sensitive content. In FIG. 8 (starting with the annotations in an 'off' state), first threshold 820 indicates an example quantity of '8' at transition point 830 as triggering presentation of annotation indicators in a user interface. The quantity of content elements with sensitive content can increase, such as by user editing, and then might decrease after a user sees that sensitive content is present and begins selecting obfuscation options to mask this sensitive content.

Based at least on the quantity of content elements initially exceeding first threshold quantity 820 and subsequently falling below first threshold quantity 820 when elasticity factor 821 is applied to first threshold quantity 820, annotator 212 establishes second threshold quantity 822 based at least on the elasticity factor. When second threshold quantity 822 is active (i.e. when elasticity factor 821 applies to first threshold quantity 820), then second threshold quantity 822 is used to initiate removal of the presentation of the at least one annotation indicator when the quantity falls below second threshold quantity 822, as seen in transition point 832. However, based at least on the quantity of content elements initially exceeding first threshold quantity 820 and subsequently falling below first threshold quantity 820 when the elasticity factor is not applied to first threshold quantity 820, presentation of the at least one annotation indicator is removed, as indicated by transition point 831.

Elasticity factor 821 can comprise a percent ranging from 0-100 percent, or another metric. In a specific example, an annotation rule might be established that defines inclusion of over 100 SSNs in a document violates corporate policy. During editing of a document that exceeds 100 SSNs, then an annotation rule for a first threshold quantity might prompt highlighting of all of the SSNs in the document. As a user starts obfuscating the SSNs, the quantity of remaining un-obfuscated SSNs will be reduced. The elasticity factor can maintain annotation or highlighting of the SSNs even if first threshold quantity 820 that triggered the annotation is no longer met, such as when 99 SSNs remain un-obfuscated. An elasticity factor of 100 would correspond to an unmodified first threshold quantity, and an elasticity of 0 would correspond to the annotations never being removed until all SSNs are obfuscated. An intermediate value of 50 for the elasticity factor would correspond to removal of the annotations once the 50th entry is fixed after the annotations had initially been triggered to be presented. Thus, in the example in FIG. 8, the elasticity factor establishes a second threshold quantity for removal of the annotations once the annotations have been presented to a user. In this example, second threshold quantity 822 is at '2' and thus when the remaining sensitive content issues fall below '2' remaining, the annotations will be removed, as indicated by transition point 832.

If second threshold quantity 822 has been fallen below, and then additional sensitive content issues arise during content editing, then annotator 212 must decide when to alert the user by presenting the annotations again. Based at least on the quantity of content elements initially falling below second threshold quantity 822 and subsequently exceeding second threshold quantity 822 when threshold resiliency property 823 is applied to second threshold quantity 822, annotator 212 initiates presentation of further annotations in the user interface that flags the user content in the user interface as containing sensitive content, as indicated by transition point 833.

Resiliency property 823 comprises a 'stickiness' property for second threshold quantity 822, and is defined by an on/off or Boolean condition. When disabled, second threshold quantity 822 is not used for re-presenting the annotations if exceeded. When enabled, second threshold quantity 822 is used for re-presenting the annotations if exceeded. Therefore, based at least on the quantity of content elements initially falling below second threshold quantity 822 and subsequently exceeding second threshold quantity 822 when the resiliency property is not applied to second threshold quantity 822, annotator 212 withholds presentation of the annotations that flags the user content in the user interface as containing at least the sensitive content until the quantity of content elements exceeds first threshold quantity 820 again.

Figure 9:
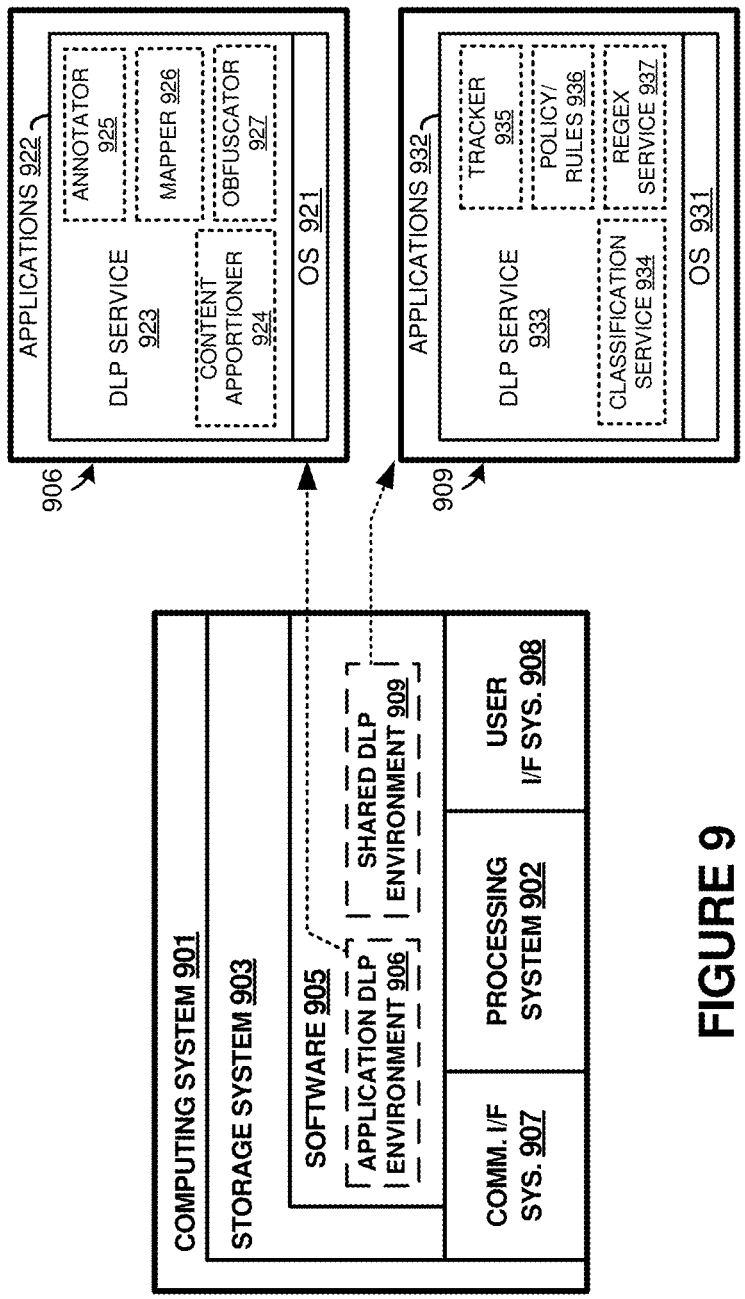
FIG. 9 illustrates a computing system suitable for implementing any of the architectures, processes, platforms, services, and operational scenarios disclosed herein.

Turning now to FIG. 9, computing system 901 is presented. Computing system 901 that is representative of any system or collection of systems in which the various operational architectures, scenarios, and processes disclosed herein may be implemented. For example, computing system 901 can be used to implement any of user platform 110 or DLP platform 120 of FIG. 1. Examples of computing system 901 include, but are not limited to, server computers, cloud computing systems, distributed computing systems, software-defined networking systems, computers, desktop computers, hybrid computers, rack servers, web servers, cloud computing platforms, and data center equipment, as well as any other type of physical or virtual server machine, and other computing systems and devices, as well as any variation or combination thereof. When portions of computing system 901 are implemented on user devices, example devices include smartphones, laptop computers, tablet computers, desktop computers, gaming systems, entertainment systems, and the like.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 908. Processing system 902 is operatively coupled with storage system 903, communication interface system 907, and user interface system 908.

Processing system 902 loads and executes software 905 from storage system 903. Software 905 includes application DLP environment 906 and/or shared DLP environment 909, which is representative of the processes discussed with respect to the preceding Figures. When executed by processing system 902 to process user content for identification, annotation, and obfuscation of sensitive content, software 905 directs processing system 902 to operate as described herein for at least the various processes, operational scenarios, and environments discussed in the foregoing implementations. Computing system 901 may optionally include additional devices, features, or functionality not discussed for purposes of brevity.

Referring still to FIG. 9, processing system 902 may comprise a microprocessor and processing circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, resistive memory, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing the dataset processing environments and platforms discussed herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software, in addition to or that include application DLP environment 906 or shared DLP environment 909. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate enhanced processing of user content for identification, annotation, and obfuscation of sensitive content. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Application DLP environment 906 or shared DLP environment 909 each includes one or more software elements, such as OS 921/931 and applications 922/932. These elements can describe various portions of computing system 901 with which users, data sources, data services, or other elements, interact. For example, OS 921/931 can provide a software platform on which application 922/932 is executed and allows for processing user content for identification, annotation, and obfuscation of sensitive content, among other functions.

In one example, DLP service 932 includes content apportioner 924, annotator 925, mapper 926, and obfuscator 927. Content apportioner 924 flattens structured or hierarchical user content elements into linear chunks for processing by a classification service. Annotator 925 graphically highlights sensitive data or content in a user interface so that users can be alerted to the presence of a threshold amount of sensitive data. Mapper 926 can derive specific locations among the documents for the sensitive data annotations, such as when only offsets/lengths/IDs are provided by a classification service to localize sensitive data in various structural or hierarchical elements of the document. Obfuscator 927 presents obfuscation options for masking/replacing of user content that has been identified as sensitive data. Obfuscator 927 also replaces the sensitive content responsive to user selections of obfuscation options.

In another example, DLP service 933 includes classification service 934, tracker 935, policy/rules module 936, and regex service 937. Classification service 934 parses through linear chunks of data or content to identify sensitive data. Tracker 935 maintains counts or quantities of sensitive data items found by classification service 934, and indicates the sensitive data offsets and lengths to a mapper for annotation in a document (such as mapper 926 and annotator 925). Policy/rules module 936 can receive and maintain various policies and rules for annotation, classification, detection, obfuscation, or other operations on user content. Regex service 937 comprises one example classification technique using regular expression matching to identify sensitive data using data patterns or data schemes, and to replace text of the matched content with obfuscated content.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. Physical or logical elements of communication interface system 907 can receive datasets from telemetry sources, transfer datasets and control information between one or more distributed data storage elements, and interface with a user to receive data selections and provide visualized datasets, among other features.

User interface system 908 is optional and may include a keyboard, a mouse, a voice input device, a touch input device for receiving input from a user. Output devices such as a display, speakers, web interfaces, terminal interfaces, and other types of output devices may also be included in user interface system 908. User interface system 908 can provide output and receive input over a network interface, such as communication interface system 907. In network examples, user interface system 908 might packetize display or graphics data for remote display by a display system or computing system coupled over one or more network interfaces. Physical or logical elements of user interface system 908 can receive classification rules or policies from users or policy personnel, receive data editing activity from users, present sensitive content annotations to users, provide obfuscation options to users, and present obfuscated user content to users, among other operations. User interface system 908 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

Example 1

A method of operating user application, the method comprising identifying at least a first threshold quantity, an elasticity factor for modifying the first threshold quantity to a second threshold quantity when enabled, and an indication of a threshold resiliency property indicating when the second threshold quantity overrides the first threshold quantity, and monitoring a content edit process of user content in a user data file to identify a quantity of content elements among the user content that contain sensitive data corresponding to one or more predetermined data schemes. The method includes, during the content edit process, enabling and disabling presentation of annotation indicators for one or more of the content elements based at least in part on a current quantity of the content elements with regard to the first threshold quantity, the elasticity factor for the first threshold quantity when enabled, and the indication of the threshold resiliency property.

Example 2

The method of Examples 1, where the annotation indicators comprise one or more of a global indicator presented in a user interface to the user application that applies to the user data file, and individual indicators presented in the user interface positioned proximate to individual content elements containing the sensitive data.

Example 3

The method of Examples 1, further comprising, during the content edit process, based at least on the current quantity of content elements exceeding the first threshold quantity, initiating presentation of at least one annotation indicator in the user interface that flags the user content in the user interface as containing at least first sensitive data. The method further includes, during the content edit process, based at least on the current quantity of content elements initially exceeding the first threshold quantity and subsequently falling below the first threshold quantity when the elasticity factor is applied to the first threshold quantity, establishing a second threshold quantity based at least on the elasticity factor for removal of the presentation of the at least one annotation indicator. The method further includes, during the content edit process, based at least on the current quantity of content elements falling below the second threshold quantity when the elasticity factor is applied to the first threshold quantity, initiating removal of the presentation of the at least one annotation indicator. The method further includes, during the content edit process, based at least on the current quantity of content elements initially falling below the second threshold quantity and subsequently exceeding the second threshold quantity when the threshold resiliency property is applied to the second threshold quantity, initiating presentation of at least one further annotation indicator in the user interface that flags the user content in the user interface as containing at least second sensitive data.

Example 4

The method of Examples 3, further comprising, during the content edit process, based at least on the current quantity of content elements initially exceeding the first threshold quantity and subsequently falling below the first threshold quantity when the elasticity factor is not applied to the first threshold quantity, removing presentation of the at least one annotation indicator. The method further includes, during the content edit process, based at least on the current quantity of content elements initially falling below the second threshold quantity and subsequently exceeding the second threshold when the resiliency property is not applied to the second threshold quantity, withholding presentation of the at least one further annotation indicator that flags the user content in the user interface as containing at least the second sensitive data until the quantity of content elements exceeds the first threshold quantity.

Example 5

A data privacy annotation framework for a user application, comprising one or more computer readable storage media, a processing system operatively coupled with the one or more computer readable storage media, and program instructions stored on the one or more computer readable storage media. Based at least on being read and executed by the processing system, the program instructions direct the processing system to at least identify one or more of a first threshold quantity, an elasticity factor for the first threshold quantity, and an indication of a threshold resiliency property, and monitor user content in a user data file presented for content editing in a user interface to the user application to identify a quantity of content elements containing sensitive data among the user content corresponding to one or more predetermined data schemes. The program instructions further direct the processing system to, during the content editing, and based at least on the quantity of content elements exceeding the first threshold quantity, initiate presentation of at least one annotation indicator in the user interface that flags the user content in the user interface as containing at least first sensitive data. The program instructions further direct the processing system to, during the content editing, and based at least on the quantity of content elements initially exceeding the first threshold quantity and subsequently falling below the first threshold quantity when the elasticity factor is applied to the first threshold quantity, establish a second threshold quantity based at least on the elasticity factor for removal of the presentation of the at least one annotation indicator. The program instructions further direct the processing system to, during the content editing, and based at least on the quantity of content elements initially falling below the second threshold quantity and subsequently exceeding the second threshold quantity when the threshold resiliency property is applied to the second threshold quantity, initiate presentation of at least one further annotation indicator in the user interface that flags the user content in the user interface as containing at least second sensitive data.

Example 6

The data privacy annotation framework of Examples 5, comprising further program instructions, based at least on being read and executed by the processing system, direct the processing system to at least, during the content editing, based at least on the quantity of content elements falling below the second threshold quantity when the elasticity factor is applied to the first threshold quantity, initiate removal of the presentation of the at least one annotation indicator.

Example 7

The data privacy annotation framework of Examples 5, comprising further program instructions, based at least on being read and executed by the processing system, direct the processing system to at least, during the content editing, based at least on the quantity of content elements initially exceeding the first threshold quantity and subsequently falling below the first threshold quantity when the elasticity factor is not applied to the first threshold quantity, remove presentation of the at least one annotation indicator.

Example 8

The data privacy annotation framework of Examples 5, comprising further program instructions, based at least on being read and executed by the processing system, direct the processing system to at least, during the content editing, based at least on the quantity of content elements initially falling below the second threshold quantity and subsequently exceeding the second threshold when the resiliency property is not applied to the second threshold quantity, withhold presentation of the at least one further annotation indicator that flags the user content in the user interface as containing at least the second sensitive data until the quantity of content elements exceeds the first threshold quantity.

Example 9

The data privacy annotation framework of Examples 5, where identifying one or more of the first threshold quantity, the elasticity factor for the first threshold quantity, and the indication of a threshold resiliency property comprises determining an annotation policy established for a target entity associated with the content editing, the annotation policy comprising one or more of the first threshold quantity, the elasticity factor for the first threshold quantity, and the indication of a threshold resiliency property.

Example 10

The data privacy annotation framework of Examples 9, where the target entity comprises at least one of a user performing the content editing, an organization that comprises the user performing the content editing, and an application type of the user application.

Example 11

The data privacy annotation framework of Examples 5, where the at least one annotation indicator and the at least one further annotation indicator each comprise one or more of a global indicator presented in the user interface that applies to the user data file, and individual indicators presented in the user interface positioned proximate to individual content elements containing the sensitive data.

Example 12

The data privacy annotation framework of Examples 5, where the one or more predetermined data schemes are defined by one or more expressions used by a classification service to parse the user content and identify ones of the content elements containing data indicative of one or more predetermined content patterns or one or more predetermined content types.

Example 13

A method of providing a data privacy annotation framework for a user application, the method comprising identifying one or more of a first threshold quantity, an elasticity factor for the first threshold quantity, and an indication of a threshold resiliency property, and monitoring user content in a user data file presented for content editing in a user interface to the user application to identify a quantity of content elements containing sensitive data among the user content corresponding to one or more predetermined data schemes. The method includes, during the content edit process, based at least on the quantity of content elements exceeding the first threshold quantity, initiating presentation of at least one annotation indicator in the user interface that flags the user content in the user interface as containing at least first sensitive data. The method includes, during the content edit process, based at least on the quantity of content elements initially exceeding the first threshold quantity and subsequently falling below the first threshold quantity when the elasticity factor is applied to the first threshold quantity, establishing a second threshold quantity based at least on the elasticity factor for removal of the presentation of the at least one annotation indicator. The method includes, during the content edit process, based at least on the quantity of content elements initially falling below the second threshold quantity and subsequently exceeding the second threshold quantity when the threshold resiliency property is applied to the second threshold quantity, initiating presentation of at least one further annotation indicator in the user interface that flags the user content in the user interface as containing at least second sensitive data.

Example 14

The method of Examples 13, further comprising, during the content editing, based at least on the quantity of content elements falling below the second threshold quantity when the elasticity factor is applied to the first threshold quantity, initiating removal of the presentation of the at least one annotation indicator.

Example 15

The method of Examples 13, further comprising, during the content editing, based at least on the quantity of content elements initially exceeding the first threshold quantity and subsequently falling below the first threshold quantity when the elasticity factor is not applied to the first threshold quantity, removing presentation of the at least one annotation indicator.

Example 16

The method of Examples 13, further comprising, during the content editing, based at least on the quantity of content elements initially falling below the second threshold quantity and subsequently exceeding the second threshold when the resiliency property is not applied to the second threshold quantity, withholding presentation of the at least one further annotation indicator that flags the user content in the user interface as containing at least the second sensitive data until the quantity of content elements exceeds the first threshold quantity.

Example 17

The method of Examples 13, where identifying one or more of the first threshold quantity, the elasticity factor for the first threshold quantity, and the indication of a threshold resiliency property comprises determining an annotation policy established for a target entity associated with the content editing, the annotation policy comprising one or more of the first threshold quantity, the elasticity factor for the first threshold quantity, and the indication of a threshold resiliency property.

Example 18

The method of Examples 17, where the target entity comprises at least one of a user performing the content editing, an organization that comprises the user performing the content editing, and an application type of the user application.

Example 19

The method of Examples 13, where the at least one annotation indicator and the at least one further annotation indicator each comprise one or more of a global indicator presented in the user interface that applies to the user data file, and individual indicators presented in the user interface positioned proximate to individual content elements containing the sensitive data.

Example 20

The method of Examples 13, where the one or more predetermined data schemes are defined by one or more expressions used by a classification service to parse the user content and identify ones of the content elements containing data indicative of one or more predetermined content patterns or one or more predetermined content types.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above, but only by the claims and their equivalents.

What is claimed is:

1. A method of operating user application, the method comprising:
    identifying at least a first threshold quantity, an elasticity factor for modifying the first threshold quantity to a second threshold quantity when enabled, and an indication of a threshold resiliency property indicating when the second threshold quantity overrides the first threshold quantity;
    monitoring a content edit process of user content in a user data file to identify a quantity of content elements among the user content that contain sensitive data corresponding to one or more predetermined data schemes; and
    during the content edit process, enabling and disabling presentation of annotation indicators for one or more of the content elements based at least in part on a current quantity of the content elements with regard to the first threshold quantity, the elasticity factor for the first threshold quantity when enabled, and the indication of the threshold resiliency property.

2. The method of claim 1, wherein the annotation indicators comprise one or more of:
    a global indicator presented in a user interface to the user application that applies to the user data file; and
    individual indicators presented in the user interface positioned proximate to individual content elements containing the sensitive data.

3. The method of claim 1, further comprising:
    during the content edit process:
        based at least on the current quantity of content elements exceeding the first threshold quantity, initiating presentation of at least one annotation indicator in the user interface that flags the user content in the user interface as containing at least first sensitive data;
        based at least on the current quantity of content elements initially exceeding the first threshold quantity and subsequently falling below the first threshold quantity when the elasticity factor is applied to the first threshold quantity, establishing a second threshold quantity based at least on the elasticity factor for removal of the presentation of the at least one annotation indicator;
        based at least on the current quantity of content elements falling below the second threshold quantity when the elasticity factor is applied to the first threshold quantity, initiating removal of the presentation of the at least one annotation indicator; and
based at least on the current quantity of content elements initially falling below the second threshold quantity and subsequently exceeding the second threshold quantity when the threshold resiliency property is applied to the second threshold quantity, initiating presentation of at least one further annotation indicator in the user interface that flags the user content in the user interface as containing at least second sensitive data.

4. The method of claim 3, further comprising:
during the content edit process:
based at least on the current quantity of content elements initially exceeding the first threshold quantity and subsequently falling below the first threshold quantity when the elasticity factor is not applied to the first threshold quantity, removing presentation of the at least one annotation indicator; and
based at least on the current quantity of content elements initially falling below the second threshold quantity and subsequently exceeding the second threshold when the resiliency property is not applied to the second threshold quantity, withholding presentation of the at least one further annotation indicator that flags the user content in the user interface as containing at least the second sensitive data until the quantity of content elements exceeds the first threshold quantity.

5. A data privacy annotation framework for a user application, comprising:
one or more computer readable storage media;
a processing system operatively coupled with the one or more computer readable storage media; and
program instructions stored on the one or more computer readable storage media that, based at least on being read and executed by the processing system, direct the processing system to at least:
identify one or more of a first threshold quantity, an elasticity factor for the first threshold quantity, and an indication of a threshold resiliency property;
monitor user content in a user data file presented for content editing in a user interface to the user application to identify a quantity of content elements containing sensitive data among the user content corresponding to one or more predetermined data schemes; and
during the content editing:
based at least on the quantity of content elements exceeding the first threshold quantity, initiate presentation of at least one annotation indicator in the user interface that flags the user content in the user interface as containing at least first sensitive data;
based at least on the quantity of content elements initially exceeding the first threshold quantity and subsequently falling below the first threshold quantity when the elasticity factor is applied to the first threshold quantity, establish a second threshold quantity based at least on the elasticity factor for removal of the presentation of the at least one annotation indicator; and
based at least on the quantity of content elements initially falling below the second threshold quantity and subsequently exceeding the second threshold quantity when the threshold resiliency property is applied to the second threshold quantity, initiate presentation of at least one further annotation indicator in the user interface that flags the user content in the user interface as containing at least second sensitive data.

6. The data privacy annotation framework of claim 5, comprising further program instructions, based at least on being read and executed by the processing system, direct the processing system to at least:
during the content editing, based at least on the quantity of content elements falling below the second threshold quantity when the elasticity factor is applied to the first threshold quantity, initiate removal of the presentation of the at least one annotation indicator.

7. The data privacy annotation framework of claim 5, comprising further program instructions, based at least on being read and executed by the processing system, direct the processing system to at least:
during the content editing, based at least on the quantity of content elements initially exceeding the first threshold quantity and subsequently falling below the first threshold quantity when the elasticity factor is not applied to the first threshold quantity, remove presentation of the at least one annotation indicator.

8. The data privacy annotation framework of claim 5, comprising further program instructions, based at least on being read and executed by the processing system, direct the processing system to at least:
during the content editing, based at least on the quantity of content elements initially falling below the second threshold quantity and subsequently exceeding the second threshold when the resiliency property is not applied to the second threshold quantity, withhold presentation of the at least one further annotation indicator that flags the user content in the user interface as containing at least the second sensitive data until the quantity of content elements exceeds the first threshold quantity.

9. The data privacy annotation framework of claim 5, wherein identifying one or more of the first threshold quantity, the elasticity factor for the first threshold quantity, and the indication of a threshold resiliency property comprises determining an annotation policy established for a target entity associated with the content editing, the annotation policy comprising one or more of the first threshold quantity, the elasticity factor for the first threshold quantity, and the indication of a threshold resiliency property.

10. The data privacy annotation framework of claim 9, wherein the target entity comprises at least one of a user performing the content editing, an organization that comprises the user performing the content editing, and an application type of the user application.

11. The data privacy annotation framework of claim 5, wherein the at least one annotation indicator and the at least one further annotation indicator each comprise one or more of:
a global indicator presented in the user interface that applies to the user data file; and
individual indicators presented in the user interface positioned proximate to individual content elements containing the sensitive data.

12. The data privacy annotation framework of claim 5, wherein the one or more predetermined data schemes are defined by one or more expressions used by a classification service to parse the user content and identify ones of the content elements containing data indicative of one or more predetermined content patterns or one or more predetermined content types.

13. A method of providing a data privacy annotation framework for a user application, the method comprising:
identifying one or more of a first threshold quantity, an elasticity factor for the first threshold quantity, and an indication of a threshold resiliency property;
monitoring user content in a user data file presented for content editing in a user interface to the user application to identify a quantity of content elements containing sensitive data among the user content corresponding to one or more predetermined data schemes; and
during the content editing:
based at least on the quantity of content elements exceeding the first threshold quantity, initiating presentation of at least one annotation indicator in the user interface that flags the user content in the user interface as containing at least first sensitive data;
based at least on the quantity of content elements initially exceeding the first threshold quantity and subsequently falling below the first threshold quantity when the elasticity factor is applied to the first threshold quantity, establishing a second threshold quantity based at least on the elasticity factor for removal of the presentation of the at least one annotation indicator; and
based at least on the quantity of content elements initially falling below the second threshold quantity and subsequently exceeding the second threshold quantity when the threshold resiliency property is applied to the second threshold quantity, initiating presentation of at least one further annotation indicator in the user interface that flags the user content in the user interface as containing at least second sensitive data.

14. The method of claim 13, further comprising:
during the content editing, based at least on the quantity of content elements falling below the second threshold quantity when the elasticity factor is applied to the first threshold quantity, initiating removal of the presentation of the at least one annotation indicator.

15. The method of claim 13, further comprising:
during the content editing, based at least on the quantity of content elements initially exceeding the first threshold quantity and subsequently falling below the first threshold quantity when the elasticity factor is not applied to the first threshold quantity, removing presentation of the at least one annotation indicator.

16. The method of claim 13, further comprising:
during the content editing, based at least on the quantity of content elements initially falling below the second threshold quantity and subsequently exceeding the second threshold when the resiliency property is not applied to the second threshold quantity, withholding presentation of the at least one further annotation indicator that flags the user content in the user interface as containing at least the second sensitive data until the quantity of content elements exceeds the first threshold quantity.

17. The method of claim 13, wherein identifying one or more of the first threshold quantity, the elasticity factor for the first threshold quantity, and the indication of a threshold resiliency property comprises determining an annotation policy established for a target entity associated with the content editing, the annotation policy comprising one or more of the first threshold quantity, the elasticity factor for the first threshold quantity, and the indication of a threshold resiliency property.

18. The method of claim 17, wherein the target entity comprises at least one of a user performing the content editing, an organization that comprises the user performing the content editing, and an application type of the user application.

19. The method of claim 13, wherein the at least one annotation indicator and the at least one further annotation indicator each comprise one or more of:
a global indicator presented in the user interface that applies to the user data file; and
individual indicators presented in the user interface positioned proximate to individual content elements containing the sensitive data.

20. The method of claim 13, wherein the one or more predetermined data schemes are defined by one or more expressions used by a classification service to parse the user content and identify ones of the content elements containing data indicative of one or more predetermined content patterns or one or more predetermined content types.

* * * * *